(12) United States Patent
Bayer et al.

(10) Patent No.: US 6,311,190 B1
(45) Date of Patent: Oct. 30, 2001

(54) SYSTEM FOR CONDUCTING SURVEYS IN DIFFERENT LANGUAGES OVER A NETWORK WITH SURVEY VOTER REGISTRATION

(75) Inventors: Leonard Robert Bayer; John Jason Mott; Albina Radielovic; Frederick Anton Eilers Beer, all of Rochester, NY (US)

(73) Assignee: Harris Interactive Inc., Rochester, NY (US)

( * ) Notice: Subject to any disclaimer, the term of this patent is extended or adjusted under 35 U.S.C. 154(b) by 0 days.

(21) Appl. No.: 09/243,064

(22) Filed: Feb. 2, 1999

(51) Int. Cl.[7] .................................................. G06F 17/30

(52) U.S. Cl. ...................... 707/104; 707/536; 707/10; 455/2.01; 709/203; 705/12

(58) Field of Search ............................ 707/10, 104, 536; 705/12; 455/2.01; 709/203

(56) References Cited

U.S. PATENT DOCUMENTS

| | | |
|---|---|---|
| 4,595,980 | 6/1986 | Innes . |
| 4,847,685 * | 7/1989 | Gall et al. ............................... 725/14 |
| 5,189,288 * | 2/1993 | Anno et al. ............................ 235/386 |
| 5,218,528 * | 6/1993 | Wise et al. ............................. 705/12 |
| 5,428,772 | 6/1995 | Merz . |
| 5,583,761 | 12/1996 | Chou . |
| 5,749,043 * | 5/1998 | Worthy ............................... 455/2.01 |

(List continued on next page.)

OTHER PUBLICATIONS

Roy G, Saltman, Communication of the ACM; "accuracy, integrity and security in computerized vote–tallying", Oct. 1988.*

* cited by examiner

*Primary Examiner*—John Breene
*Assistant Examiner*—Debbie M Le
(74) *Attorney, Agent, or Firm*—Kenneth J. LuKacher

(57) ABSTRACT

A system for conducting surveys to voters in multiple different languages and registering voters is provided over a network, such as the Internet. The system includes a programmed computer system representing at least one network server which provides an addressable voting site and registration site on the network, and a database storing voting information for building surveys in multiple languages and recording the results of the surveys, and registration information for building registration questionnaires and recording the results of the questionnaires. The network server accesses and updates the records of multiple tables of the database through a transaction server connected to the database. In response to a computer of a voter connecting to the network server over the network, the network server determines the language and country of the voter, and then dynamically constructs a survey in the voter's language in accordance with the voting information stored in the database. The survey is transmitted in a survey form page to the voter's computer which enables the voter to answer each question and to submit such answers back to the network server. The received answers to the questions are added to records in the database tallying the totals for each response answered for each question for the country of the voter, and the total number of voters answering each question for the country of the voter. A summary of the results of the survey for the country of the voter, or for other countries, is then constructed and transmitted to the voter's computer. The system may support multiple voting campaigns having surveys. The system allows voters, or other registrants, to register at one of the registration campaigns at the registration site, which may be linked to a voting campaign, by constructing a registration questionnaire based on the registration information stored in the database, and sending the questionnaire in a registration form page in the voter's language to the voter to complete and return to the network server for storage of the voter's registration data.

36 Claims, 27 Drawing Sheets

U.S. PATENT DOCUMENTS

| | | | |
|---|---|---|---|
| 5,835,912 | * 11/1998 | Pet | 707/104 |
| 5,878,399 | * 3/1999 | Peralto | 705/12 |
| 5,893,098 | 4/1999 | Peters et al. | 707/10 |
| 5,914,712 | * 6/1999 | Sartain et al. | 345/327 |
| 6,018,344 | * 1/2000 | Harada et al. | 345/357 |
| 6,023,698 | * 2/2000 | Lavey, Jr. et al. | 707/10 |
| 6,029,195 | * 2/2000 | Herz | 709/219 |
| 6,138,086 | * 10/2000 | Rose et al. | 704/8 |
| 6,151,707 | * 11/2000 | Hecksel et al. | 717/11 |
| 6,175,833 | * 1/2001 | West et al. | 707/102 |

VOTECAMPAIGN 30

| | |
|---|---|
| CampaignID (PK) | int |
| Name | varchar(80) |
| StartDate | datetime |
| DisplayLength | smallint |
| Active | bit |
| Default Flag | bit |
| ReferrLink | varchar(255) |
| DirectoryName | varchar(20) |

FIG. 3A

LANGUAGE 31

| | |
|---|---|
| LangID (PK) | int |
| Language | varchar(255) |
| LangGraphic | varchar(30) |
| LangRefName | varchar(5) |
| LangCodePage | int |
| LangLCID | varchar(4) |

FIG. 3B

CATEGORY

| | |
|---|---|
| CampaignID (PK) | int |
| Name | varchar(255) |
| DefaultLangID (FK) | int |

32 FIG. 3C

CAMPAIGNCATEGORY

| | |
|---|---|
| CampCatID (PK) | int |
| CampaignID (FK) | int |
| CategoryID (FK) | int |

FIG. 3D 33

LANGCATEGORY 34

| | |
|---|---|
| LangCategoryID (PK) | int |
| Category | varchar(255) |
| LangID (FK) | int |
| CategoryID (FK) | int |

FIG. 3E

VOTECOLORS 35

| | |
|---|---|
| VoteColorID (PK) | int |
| CampaignID (FK) | int |
| BodyColor | varchar(20) |
| BodyFont | varchar(30) |

FIG. 3F

POLL

| | |
|---|---|
| PollID (PK) | int |
| PollName | varchar(50) |
| CampaignID (FK) | int |
| PollOrder | int |
| Active | bit |
| PollDate | datetime |
| DefaultLangID (FK) | int |

FIG. 3G 36

LANGPOLL

| | |
|---|---|
| LangPollID (PK) | int |
| LangID (FK) | int |
| PollID (FK) | int |
| PollName | varchar(255) |
| PollClose | varchar(255) |

FIG. 3H 37

QUESTIONTYPE

| | |
|---|---|
| QuestionTypeID (PK) | int |
| Name | varchar(50) |
| Description | varchar(100) |

FIG. 3I 38

VOTEQUESTIONS

| | |
|---|---|
| QuestionID (PK) | int |
| Name | varchar(255) |
| QuestionTypeID (FK) | int |
| PollID (FK) | int |
| QuestionOrder | int |
| QuestionTally | int |

FIG. 3J 39

LANGQUESTION

| | |
|---|---|
| LangQuestionID (PK) | int |
| Question | varchar(255) |
| LangID (FK) | int |
| QuestionID (FK) | int |

FIG. 3K 40

VOTEANSWERS

| | |
|---|---|
| AnswerID (PK) | int |
| Name | varchar(255) |
| QuestionID (FK) | int |

FIG. 3L 41

LANGANSWER

| | |
|---|---|
| LangAnswerID (PK) | int |
| Answer | varchar(255) |
| AnswerID (FK) | int |
| LangID (FK) | int |

FIG. 3M 42

ACCESS 43

| AccessID (PK) | int |
|---|---|
| CampaignID (FK) | int |
| CategoryID (FK) | int |
| inUse | bit |
| RefName | varchar(30) |
| FromWhere | varchar(255) |
| DefaultFlag | bit |

FIG. 3N

VOTELOG 44

| LogID (PK) | int |
|---|---|
| IPaddress | varcher(50) |
| CampaignID | int |
| BrowserType | varchar(75) |
| ReferingSite | varchar(255) |
| RegCookie | varchar(20) |
| CreateDate | datetime |
| OtherPolls | varchar(255) |
| VoteCookie | varchar(20) |
| AccessID (FK) | int |
| ActionID (FK) | int |

FIG. 3O

ACTIONTYPE 45

| ActionID (PK) | int |
|---|---|
| Action | varchar(20) |

FIG. 3P

TALLY 46

| TallyID (PK) | int |
|---|---|
| AnswerID (FK) | int |
| TallyCount | int |
| Value | varchar(50) |
| PollID (FK) | int |
| CategoryID (FK) | int |

FIG. 3Q

QUESTIONTALLY 47

| QuestionTallyID (PK) | int |
|---|---|
| QuestionTally | int |
| QuestionID (FK) | int |
| CategoryID (FK) | int |

FIG. 3R

CAMPAIGN 172

| | |
|---|---|
| CampaignID (PK) | int |
| Name | varchar(80) |
| BeginDate | datetime |
| Active | bit |
| ReferringSite | varchar(255) |
| SurveyID (FK) | int |
| DirectoryName | varchar(20) |
| ThankYouURL | varchar(255) |

FIG. 16A

LANGUAGE 173

| | |
|---|---|
| LangID (PK) | int |
| Language | varchar(255) |
| LangGraphic | varchar(30) |
| LangRefName | varchar(5) |
| LangCodePage | int |
| LangLCID | varchar(4) |

FIG. 16B

LANGCAMPAIGN 174

| | |
|---|---|
| LangCampaignID (PK) | int |
| LangID (FK) | int |
| CampaignID (FK) | int |
| Campaign | varchar(80) |

FIG. 16C

SURVEYLINK 175

| | |
|---|---|
| SurveyID (PK) | int |
| Name | varchar(100) |
| URL | varchar(255) |
| Active | bit |

FIG. 16D

LANGSURVEY 176

| | |
|---|---|
| LangSurveyID (PK) | int |
| LangID (FK) | int |
| SurveyID (FK) | int |
| Survey | varchar(100) |

FIG. 16E

QUESTIONS 177

| | |
|---|---|
| QuestionID (PK) | int |
| Question | varchar(255) |
| QuestionTypeID (FK) | int |
| Name | varchar(255) |
| MaxLength | int |

FIG. 16F

QUESTIONTYPE 178
| | |
|---|---|
| QuestionTypeID (PK) | int |
| Name | varchar(50) |
| Description | varchar(100) |

FIG. 16G

CAMPAIGNQUESTION 179
| | |
|---|---|
| CampainQuestionID (PK) | int |
| QuestionID (FK) | int |
| CampaignID (FK) | int |
| Active | bit |
| Required | smallint |
| FieldOrder | smallint |
| OptionalFlag | smallint |

FIG. 16H

LANGQUESTION 180
| | |
|---|---|
| LangQuestionID (PK) | int |
| LangID (FK) | int |
| QuestionID (FK) | int |
| Question | varchar(255) |

FIG. 16I

SUBQUESTION 181
| | |
|---|---|
| SubquestionID (PK) | int |
| Name | varchar(50) |
| QuestionID (FK) | int |
| FieldOrder | smallint |
| NewLineYes | bit |
| DefaultFlag | smallint |

FIG. 16J

VALIDATIONDATA 182
| | |
|---|---|
| ValidationID (PK) | int |
| QuestionID (FK) | int |
| SubquestionID (FK) | int |
| MinValue | int |
| MaxValue | int |
| DefaultFlag | bit |

FIG. 16K

LANGSUBQUESTION 183
| | |
|---|---|
| LangSubquestID (PK) | int |
| LangID (FK) | int |
| LangquestionID (FK) | int |
| Name | varchar(50) |

FIG. 16L

CAMPAIGNSEPARATOR 184

| | |
|---|---|
| CampSepID (PK) | int |
| CampaignID (FK) | int |
| SepID (FK) | int |
| FieldOrder | smallint |
| Title | varchar(100) |
| Active | bit |

FIG. 16M

SEPARATORTYPE 185

| | |
|---|---|
| SepID (PK) | int |
| Name | varchar(20) |

FIG. 16N

USERS 186

| | |
|---|---|
| UserID (PK) | int |
| Email | varchar(75) |
| Nickname | varchar(20) |
| Password | varchar(16) |
| Cookie | varchar(20) |
| Unsubscribe | bit |
| UnsubscribeDate | datetime |
| ImportFlag | bit |

FIG. 16O

CAMPAIGNUSER 187

| | |
|---|---|
| CampaignUserID (PK) | int |
| CampaignID (FK) | int |
| UserID (FK) | int |
| Unsubscribe | bit |
| UnsubscribeDate | datetime |

FIG. 16P

UNSUBSCRIBEDATA 188

| | |
|---|---|
| UnsubscribeID (PK) | int |
| CampaignUserID (FK) | int |
| LangQuestionID (FK) | int |
| SubquestionID (FK) | int |
| WhyUnsubscribe | varchar(100) |

FIG. 16Q

TRANSACTIONS 189

| | |
|---|---|
| TransactionID (PK) | int |
| UserID (FK) | int |
| ActionID (FK) | int |
| ActionDateTime | datetime |
| CreateDate | datetime |
| CampaignID (FK) | int |
| IPAdress | varchar(50) |
| BrowserType | varchar(75) |
| ReferringSite | varchar(255) |
| InitialID (FK) | int |

FIG. 16R

ACTIONTYPE 190

| | |
|---|---|
| ActionID (PK) | int |
| Name | varchar(100) |

FIG. 16S

INITIALACCESS 191

| | |
|---|---|
| InitialID (PK) | int |
| AccessID (FK) | int |
| CreateDate | datetime |
| ReferringDomain | varchar(50) |
| IPAddress | varchar(50) |
| BrowserType | varchar(75) |

FIG. 16T

ACCESS 192

| | |
|---|---|
| AccessID (PK) | int |
| CampaignID (FK) | int |
| RefName | varchar(30) |
| inUse | bit |
| FromWhere | varchar(255) |
| DefaultFlag | bit |
| DefaultLangID (FK) | int |

FIG. 16U

REGISTRATIONDATA 193

| | |
|---|---|
| DataID (PK) | int |
| UserID (FK) | int |
| QuestionID (FK) | int |
| Answer | varchar(255) |
| SubquestionID (FK) | int |
| ModifyDate | datetime |
| ImportFlag | bit |
| LangID (FK) | int |

FIG. 16V

SYSTEM FOR CONDUCTING SURVEYS IN DIFFERENT LANGUAGES OVER A NETWORK WITH SURVEY VOTER REGISTRATION

FIELD OF THE INVENTION

The present invention relates to a system (and method) for conducting surveys in different languages over a network, and relates particularly to a system having at least one network server providing an addressable site on a network, such as the Internet, which dynamically generates surveys which are transmitted over the network to the computers of voters in their preferred language, and sends summaries showing the results of the survey in the voter's country or the results of the survey in other countries. The system of the present invention further enables voters or other registrants to register with the system in their preferred language at another site on the network provided by the network server. The system is suitable for taking large surveys or polls of individual voters in numerous countries, while allowing voters to view by the results of the survey immediately after taking the survey and to view a comparison of the results of the survey with other countries.

BACKGROUND OF THE INVENTION

Conventionally, surveys or polls are a series of questions on a form presented to individuals, called voters, to sample the views of people in a given region or country for political, commercial or entertainment purposes. Surveys are typically conducted either in person, mail, or via telephone to a great number of individual voters. Consequently, the task of conducting a survey and tabulating the results of a survey is time consuming which delays obtaining the results of the survey, and furthermore, the results of the survey either are not available to the individuals who took the survey, or are sent to them at a later time when the entire survey is completed. It is often the individuals taking a survey who are the ones most interested in how their votes or opinions compare with others. In addition, voters in different countries or regions of a country may have different national languages, but surveys are typically provided in only the most common languages of a country or region, limiting the scope of individuals who can take the survey.

With the development of the Internet and its growing widespread use, individuals in countries throughout the world can now connect to a network site and receive pages of information via their computers and browser software. No site however has yet provided a mechanism for enabling individuals to participate in surveys in different languages or to review the results of such surveys. Although some sites require users to answer a static series of questions in a single language, for example, a user's name, E-mail address, or credit card information, they are not for survey purposes but for registering individuals to use facilities offered by the site. The results of such questions are not shared with the users, but are only accessible by system administrators.

Furthermore, with respect to registration, typically registration questions at a web site are limited to a single language, usually in English, or in the language of the users anticipated connecting to the site. This limits the scope of individuals who can register with a site, and moreover, can lead to incorrect information if the language of the site is not comprehended by the user.

Several proposed system have been developed for allowing a program to offer messages in different languages such as described, for example, in U.S. Pat. Nos. 4,595,980, 5,428,772 and 5,583,761. However such systems do not provide an integrated solution for surveys in multiple languages over a network or for registration in multiple languages, but are limited to enhancing the language capability of a user interface of an application program operating on a computer.

SUMMARY OF THE INVENTION

Accordingly, it is the principal object of the present invention to provide a system for conducting surveys over a network to multiple voters in multiple countries throughout the world in different languages.

It is another object of the present invention to provide a system for conducting surveys over a network which dynamically generates surveys from voting information stored in a database of the system.

It is a further object of the present invention to provide a system for conducting surveys over a network which shows the results of the surveys taken by voters in the voter's country and offers to the voter a comparison of the results from other countries.

It is a further object of the present invention to provide a system for conducting multiple surveys over a network for different voting campaigns.

A still further object of the present invention is to provide a system for conducting multiple surveys over a network which allows voters to vote only once on each survey.

Yet another object of the present invention is to provide a system for enabling voters or other registrants to register over a network in different languages for different registration campaigns.

Briefly described, the present invention embodies a system for conducting surveys internationally to voters in multiple different languages over a computer-based network, such as the Internet, and for registering voters or other registrants over the network in multiple different languages. The system includes a programmed computer system representing at least one network server which provides an addressable voting site and registration site on the network, and a database storing voting information for dynamically building surveys in multiple languages and recording the results of the surveys, and registration information for dynamically building registration questionnaires and recording the results of the questionnaires. The network server accesses and updates the records of multiple tables of the database storing the voting and registration information through a transaction server connected to the database. A computer of each of the voters is programmed with network browser software, such that a connection to the network server over the network can be established at one of the multiple Universal Resource Locators (URLs) addressing the voting site, where each URL identifies at the voting site a different voting campaign having one or more surveys. In response to the computer of each voter establishing a connection to the network server for a voting campaign, the computer of the voter becomes a network client of the network server, and the network server determines the preferred language of the voter and the country of the voter. Based on the voting campaign, a survey of one or more questions in the preferred language for the voter is generated in accordance with the voting information stored in the database, and transmitted over the network in a survey form page to the computer of the voter. The survey form page is an HTML document constructed from several elements, including, display characteristics (such as borders, logos, fonts, hyperlinks, and graphics), survey instructions, questions and sets of responses to questions in the preferred language of the voter. The elements may be stored in separate related records in the tables of the database with records having translations for different languages. The survey form page enables the voter to answer each question and to submit such answers back to the network server over the network. The network server receives the answers to the questions of the survey and adds those answers representing votes to records in the database tallying totals for each response answered for each question for the country of the voter, and the total number of voters answering each question for the country of the voter. The network server then generates a summary comprising both a histogram and percentage of the votes for each response for each question of the survey for the country of the voter, and transmits the summary in a results page over the network to the voter's computer. The network server also enables the voter to select and receive another results page having a summary of the votes for other countries in comparison with the results for the voter's country. The network server also enables the voter to select and receive another results page having a summary of the votes for previously recorded surveys within the same voting campaign, and to receive those results for the voter's country or with comparisons to other countries.

The network server does not permit a voter who has already voted in the survey to revote by creating, when a voter connects to the network server, a Voting Digital ID identifying at least the network server, the voting campaign and the survey. The Voting Digital ID is transmitted by the network server to the voter's computer and stored by the browser of voter's computer as a cookie. If the voter later reconnects to the network server, the network server checks if any cookies of the voter's computer represent a Voting Digital ID matching the current survey for the voting campaign, thereby determining if the voter has already voted. If a voter has already voted, the network server provides only the results page of the survey from one or more countries.

The system further enables the voters, called registrants at the registration site, to register with the system at the registration site for one or more registration campaigns. Each registration campaign has a URL addressing the registration site at which a voter's computer can register under the registration campaign. A voting campaign may or may not have a related registration campaign. In response to the computer of each voter establishing a connection to a registration campaign at the registration site, the network server determines the preferred language of the voter and the country of the voter. Based on the registration campaign, the network server constructs a registration questionnaire, similar to the survey of the voting site, based on the registration information stored in the database. The returned answers to the questionnaire are stored as registration data in the database.

Unlike a survey, a voter may later revise their responses on the registration questionnaire stored in the database. A voter may select a password, or other identifying information, to authenticate the voter before access to their previous responses to registration questions is permitted.

When a voter first connects with the network server, a Registration Digital ID is created for the voter. The preferred language and country of the voter may be associated with the Registration Digital ID in the registration information of the database to facilitate identifying the preferred language and country of the voter if the voter later reconnects with the network server. The Registration Digital ID is also sent to the voter's computer and stored as a cookie in the voter's computer.

The system of the present invention further includes an administrative interface to the voting site and the registration site to allow an administrator, via their computer, to add or modify the voting information and registration information relating to the voting campaigns, surveys, languages, countries, registration campaigns, registration questionnaires, and the questions and responses for the surveys and registration questionnaires in different languages.

The present invention also includes a method embodying the system for providing both a voting site and registration site on a network in multiple languages.

BRIEF DESCRIPTION OF THE DRAWINGS

The foregoing objects, features and advantages of the invention will become more apparent from a reading of the following description in connection with the accompanying drawings, in which:

FIGS. 3A–3R are eighteen tables storing the voting information in the database of the system of FIG. 1;

FIGS. 16A–16V are twenty-two tables storing the registration information in the database of the system of FIG. 1;

DETAILED DESCRIPTION OF THE INVENTION

Figure 1:
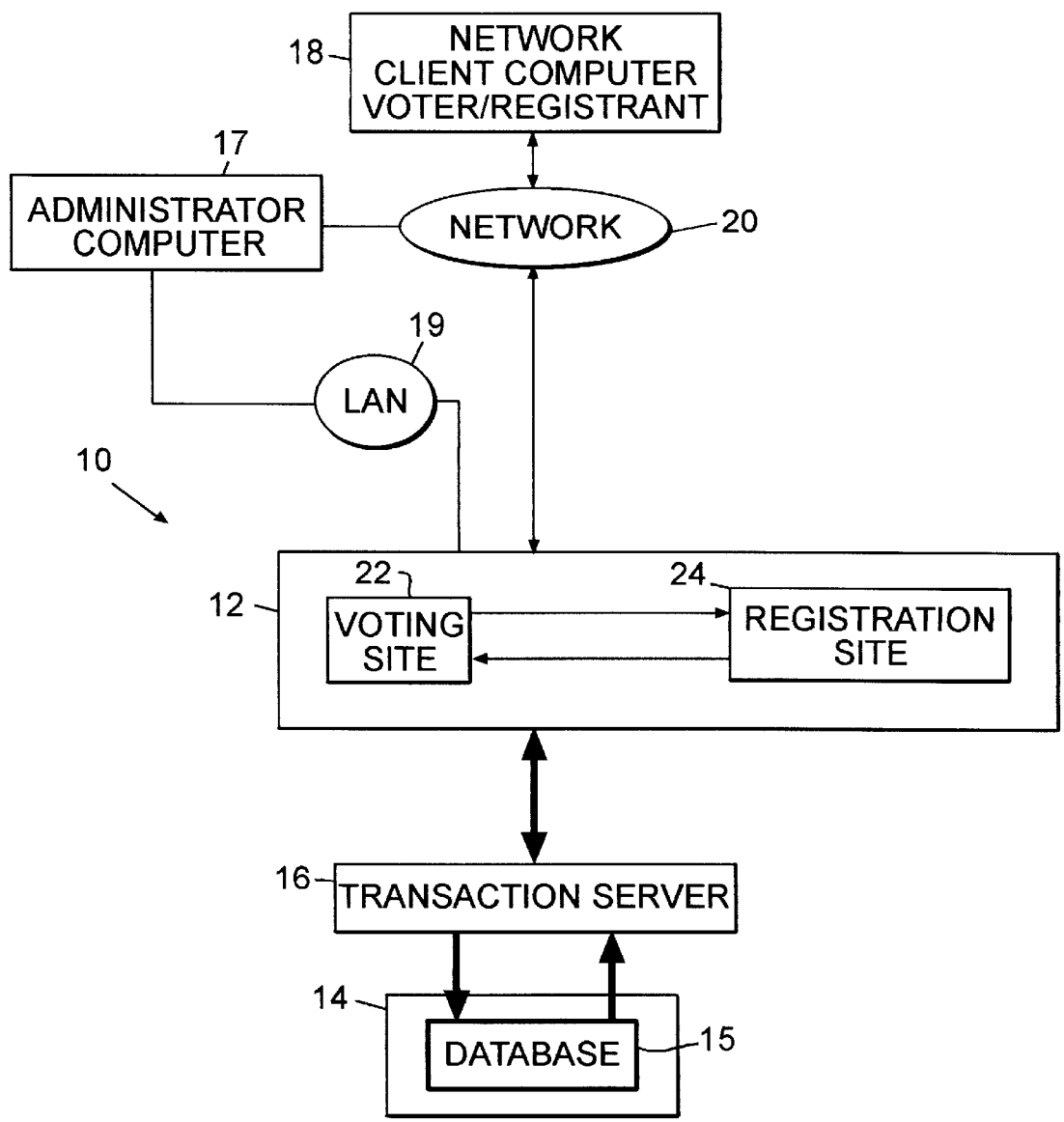
FIG. 1 is a block diagram of the system in accordance with the present invention showing a network server which provides a voting site and a registration site on a network.

Referring to FIG. 1, a system 10 of the present invention is shown having a computer system representing a network server 12, memory 14 storing a database 15, and a transaction server 16 connected to the memory 14 which enables the network server 12 to access and update records in tables of the database 15. The network server 12 enables network connections to computers 18 through a network 20. Preferably, the network is the Internet or World Wide Web (WWW), however other wide area networks may also be used. The computers 18 may be personal computers, lap-top computers, WebTV units, or other computer-based systems programmed in accordance with Internet WWW browser software, such as Microsoft Internet Explorer or Netscape Navigator, to access sites on the network 20 via a network interface, such as a modem or other network interfacing means. Each of the computers 18 represents a network client when connected to network server 12, such that the network server 12 performs tasks at the commands of the network client. The network servers 12 may be typical of computers used to provide a site or sites on the network, often referred to as web sites, through which computers 18 can establish through their browser a connection at the network IPaddress (es) of system 10, and provide network transactions with connected computers 18 based on communication protocol, such as TCP/IP, defined for the network 20. Although a single network client computer 18 is shown in FIG. 1, multiple ones of network client computer 18 can connect to the network server 12. Further, network server 12 may represent one or more redundant servers operating on multiple computer systems 12 coupled to the transaction server 16 to provide the desired maximum number connections to different ones of computers 18.

The network server 12 operates in accordance with software representing programmed instructions providing a voting site 22 and a registration site 24 on network 20. At the voting site on the network 20, documents (referred to herein as pages), preferably in HTML (HyperText Markup Language), are provided to a connected network client computer 18 enabling a voter at the computer 18 to vote on a survey in the preferred language of the voter, as will be described later in connection with FIGS. 10–13, and to receive a summary of the results of the survey from one or more countries, in the preferred language of the voter, as will be described later in connection with FIG. 14. At the registration site on the network 20, pages, preferably in HTML, are provided to a connected network client computer 18 enabling a voter or other registrant, to register with system 10 in their preferred language, as will be described later in connection with FIGS. 21–25.

The transaction server 16 represents a computer system connected to memory 14 and programmed in accordance with database software for building a meta-database 15 having related tables, and maintaining the records in such tables. Preferably, the database software is Microsoft SQL Server, however other database software may be used, such as Oracle or Sybase. The network server 12 can send data representing transactions to the transaction server 16 to either access (read, retrieve, search, or query) records in a particular table, or update (add, modify, or delete) a record in a particular table of the database. The data in each transaction has a structure determined by the data structure of the databases in accordance with the communication protocols for interfacing with the database software to provide the desired access or update function. Preferably, the transaction server is provided by one or more separate computer systems connected to database 15, however, the transaction server may be provided by software operating on network server 12.

Memory 14 is a memory storage unit, such as a disk array. Other types of memory storage units may also be used, such as the hard disk drive of the computer system providing transaction server 16.

An administrator computer 17, like computers 18, can connect to the network server 12, via network 20, using typical Internet WWW browser software to the administrative interface provided by the voting and registration sites. Alternatively, the administrator computer 17 can connect directly to the network server 12 by a LAN 19 to which both the network server 12 and administrator computer 17 are connected. The administrator computer 17 may be a personal computer, workstation, or lap-top computer. Although only one administrator computer 17 is shown in FIG. 1, a number of administrator computers 17 may be provided. The administrative interface for the voting and registration sites will be described in connection with FIGS. 4–9 and 17–20, respectively.

The terminology used in describing the voting site of system 10 will now be defined. A survey represents an ordered list of questions, where each question has a set of one or more responses of possible answers. The input fields for answers may represent select-one answer ("radio") buttons, checked boxes, text or numerical entry. A voting campaign is a designed set of one or more surveys. A survey form page represents a document having one or more surveys for a campaign to be sent to a voter's computer. The survey form page can have instructions defined for the top and bottom of each survey. A results form page represents a document containing the results of a survey for a voting campaign. Language represents the national language of one or more countries, such as French, or a language of a region within a country. A category is identical to a country at the voting site. Languages at the voting site are independent of the country A master language is the chosen national language used in the system 10 for administrative purposes, preferably English.

Figure 2:
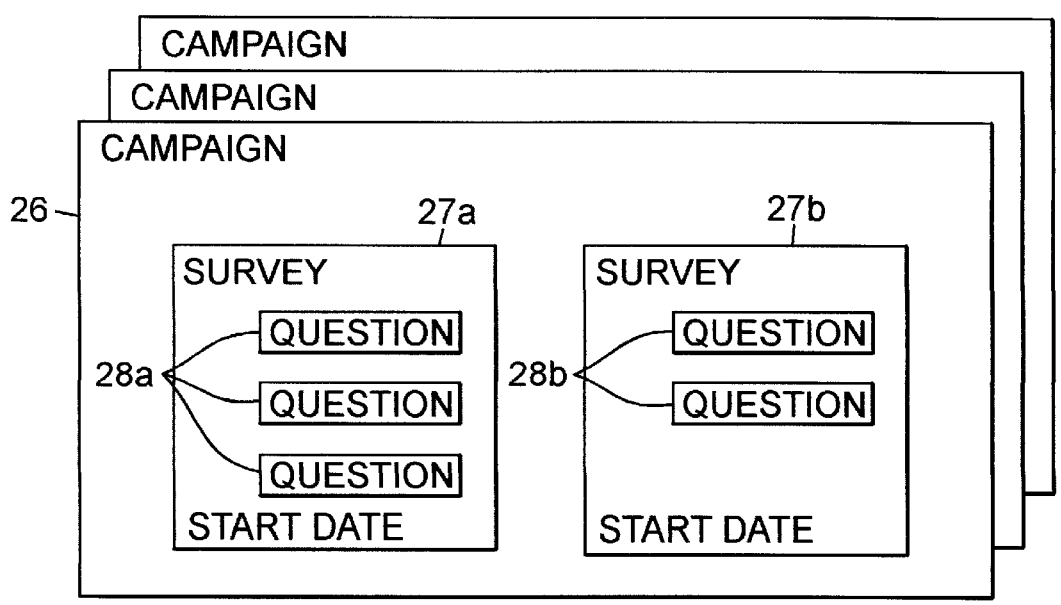
FIG. 2 is an illustration of the structure of the multiple voting campaigns and surveys for the system of FIG. 1.
Figure 2A:
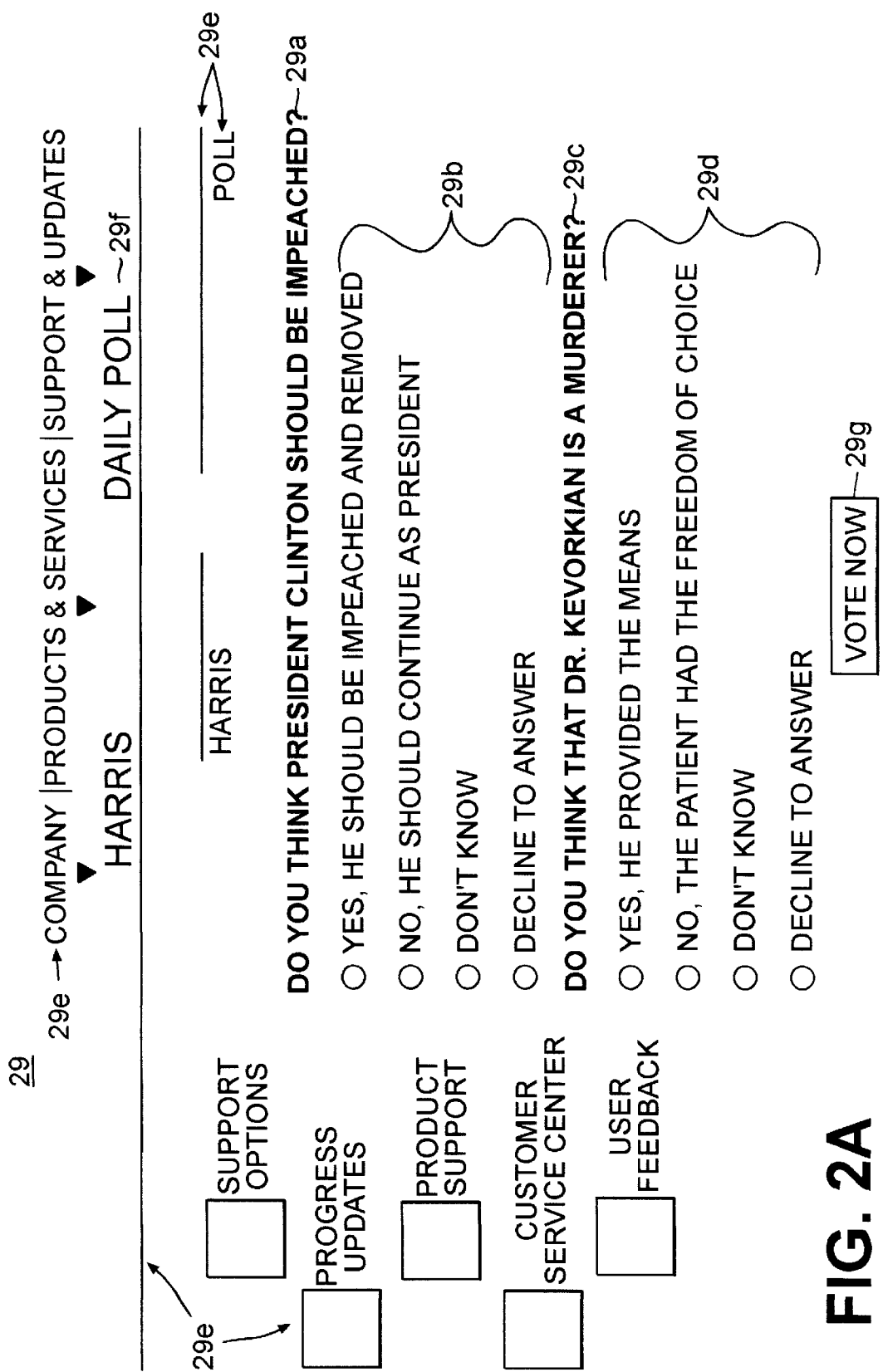
FIG. 2A is an example of a survey form page of a voting campaign at the voting site of the system of FIG. 1.

An illustration of the voting campaigns and surveys is shown in FIG. 2. For example, a first campaign 26 has two defined surveys, survey 27a with three questions 28a and survey 27b with two questions 28b. A start date is set for each survey to determine the date when the survey starts. The surveys may have a queue order under the campaign, such that after the campaign starts each survey in their queue order will be offered to voter for a preset number of day or days. Alternatively, each survey may have its own start date, in which only the survey having a start date closest to the current date can be voted on during a voting campaign. The present date and time is maintained at the network server 12. An example of a two question survey 29 for a "Harris Daily Poll" voting campaign is shown in FIG. 2A having question 29a with a set of responses 29b, and question 29c with set of responses 29d. The voter would click, via a button on their mouse interface coupled to their computer, to select the response to each question, and click on the "vote here" button to submit their votes to the network server 12.

Multiple records in tables of database 15 store voting information. The voting information includes records stored in eighteen tables 30–47, as shown in FIGS. 3A–3R. The VoteCampaign table 30 defines the campaigns for the voting site of system 10. The Language table 31 defines the languages available in system 10. The Category table 32 defines the possible countries of voters. The CampaignCategory table 33 links the records of the Campaign table to the records of the Category table 32. The LangCategory table 34 links the records of the Category table 32 to the records of the Language table 31. The VoteColors table 35 defines for each campaign a color and font for the text of each page of the campaign. The Poll table 36 defines each of the surveys. The LangPoll table 37 defines for each survey the text to be included at the top and bottom of the survey in different languages. The QuestionType table 38 defines the type of response sets for each of the questions. The VoteQuestion table 39 defines the questions in system 10 in the master language. The LangQuestion table 40 defines the translations of each question in different languages. The VoteAnswers table 41 defines the text of each of the responses for each question in the master language. The LangAnswer table 42 defines the translations of each of the responses for different languages. The Access table 43 records for each voter the current or last transaction of the voter to the voting site of system 10. The VoteLog table 44 defines a log for each voter with the voting site of system 10. The ActionType table 45 defines the different actions a voter may perform, such as voting or receiving a results page. The Tally table 46 records a tally of the vote totals for each of the answers to the questions for each survey in each of the different countries defined for a voting campaign. The QuestionTally table 47 records for each of the questions a tally of the total number voters answering the question in each of the different countries defined for a voting campaign. The relationship of the records in the tables will become more apparent in the later description of the administrative interface, and the transaction between the network server 12 and a connected voter's computer 18 at the voting site.

Referring to FIG. 3A, each record of the VoteCampaign table 30 (referred to as a votecampaign record) has the following data fields: CampaignID, a unique identifier for each voting campaign; Name, the name of the voting campaign; StartDate, the date the voting campaign will begin; DisplayLength, the number of days each survey under this voting campaign will be available for voting, for example, "1" for daily, "2" for every other day, "7" for weekly survey, and so forth; Active, a bit set to "1" or "0" depending on whether the voting campaign is active or non-active; DefaultFlag, a bit, which when set to "1", indicates that the campaign is the default campaign for the voting site; Referral Link, the URL (network address plus query string the AccessID or CampaignID) assigned for the campaign; and DirectoryName, the location in memory (such as the hard disk) of the network server 12, or database 15, of the file(s) storing an HTML template with the information to be included on each page of the voting campaign, such as borders, font type, font size, logos, embedded hyperlink buttons, or other display characteristics or features of the page, to provide a desired look and feel to the pages of the voting campaign to be sent to each voter for the campaign. An HTML template is provided for each different language associated with the voting campaign, as defined by the records for the campaign in Category and LangCategory tables 33–34, and has tags for entry of information for each page of the campaign. In the example of FIG. 2A, text, graphics or hyperlink buttons 29e would represent such information defining the look and feel of the page.

Referring to FIG. 3B, each record of the Language table 31 (referred to as a language record) has the following data fields: LangID, a unique identifier for each language defined for the voting site of system 10, such as ENG for English; Language, the name of the language, such as American English; LangGraphic, a location in memory of the network server 12 or database 15 (such as a file) storing a graphic for identifying the language, such as the flag of a country or the name of the language in that language; and LangRefName, LangCodePage, and LangLCID representing language settings defined for each language in the manual for the Microsoft Windows Software Platform on which computer system 10 is based to facilitate display of the language.

Referring to FIG. 3C, each record of the Category table 32 (referred to as a country record) has the following data fields: CategoryID, a unique identifier for a country, for example, UK; Name, the name of the country, such as the United Kingdom; and DefaultLangID, the LangID of a record of the Language table 31 representing a default language for the country, such as English for the United Kingdom.

Referring to FIG. 3D, each record of the CampaignCategory table 33 has the following data fields: CampCatID, a unique identifier for the record in this table; the CampaignID of one of the records of the VoteCampaign table 30; and CategoryID of one of the records of the Category table. For each voting campaign (CampaignID), multiple records can be provided in the CampaignCategory table defining the countries (CategoryID's) under the campaign.

Referring to FIG. 3E, each record of the LangCategory table 34 has the following data fields: LangCategoryID, a unique identifier for the record in this table; Category, the name of a country; the LangID of one of the records in the Language table; and CategoryID of one of the records of the Category table. For each language (LangID), multiple records are provided in the LangCategory table defining the countries (CategoryID's) associated with the language.

Referring to FIG. 3F, each record of the VoteColors table 35 has the following data fields: VoteColorID, a unique identifier for the record in this table; the CampaignID of one of the records of the VoteCampaign table for the campaign associated with this record; BodyColor, the color of the background of each page of the voting campaign identified in the CampaignID field of this record; and BodyFont, the color of the text on each page of the voting campaign identified in the CampaignID field of this record.

Referring to FIG. 3G, each record of the Poll table 36 (referred to as a survey record) has the following data fields: PollID, a unique identifier for each survey of the voting site of the system 10; PollName, the name defined for the survey; the CampaignID of the vote-campaign record of the voting campaign associated with the survey; PollOrder, a number indicating the queue order of the survey of this record when the survey is not yet available for voting; Active, a bit indicating if the survey is active "1" or non-active "0"; PollDate, the date the survey was last available for voting; and DefaultLangID, the LangID of a record of the Language table 31 representing a default language for the voting campaign if a voter does not select a language defined for the campaign.

Referring to FIG. 3H, each record of the LangPoll table 37 has the following data fields: LangPollID, a unique identifier for the record in this table; the LangID of one of the language records; the PollID of one of the survey records; PollName, the text to be included at the top of the survey in the language associated with the LangID of this record, or an address in database 15 storing text, graphics or hyperlink buttons to appear at the top of the survey; PollClose, the text to be included at the bottom of the survey in the language associated with the LangID of this record, or an address in database 15 storing text, graphics, or hyperlink buttons to appear at the bottom of the survey. Each language (LangID) available under a survey (PollID) for a voting campaign has a record in the LangPoll table to provide the text or other information at the bottom and top of a survey in that language.

Referring to FIG. 3I, each record of the QuestionType table 38 has the following data fields: QuestionTypeID, a unique identifier for the record in this table; Name, an identifier referring to the type of answer for the question, such as, radio button (select one of the following), a check box (select one or more of the following), or text field (free form entry of text); and Description, text in the master language referring in more detail to the identifer in the Name field. The Description field is for administrative purposes. The identifier in the Name field of the record determines the display of the responses for the question.

Referring to FIG. 3J, each record of the VoteQuestion table 39 (referred to as a question record) has the following data fields: QuestionID, a unique identifier to each question in the system 10; Name, the text of the question in the master language; the QuestionTypeID of one of the records of the QuestionType table 38 referencing the type of answer for the question; the PollID of one of the survey records to which the question of this record is related; QuestionOrder, a number indicating the order on the survey this question should appear with other questions; QuestionTally, a optional field indicating the number of responses to the question.

Referring to FIG. 3K, each record of the LangQuestion table 40 has the following data fields: LangQuestion ID, a unique identifier for the record in this table; the LangID of one of the language records; the QuestionID of one of the question records; and Question, the translated text of the question associated with the QuestionID of this record in the language associated with the LangID of this record. If the question needs instructions, for example, "select any number of the following choices," such instructions are included with the text of the question in the Question field of the record.

Referring to FIG. 3L, each record of the VoteAnswer table 41 (referred to as a response record) has the following data fields: AnswerID, a unique identifier to each response for a question in the system 10; the QuestionID of one of the question records to which the AnswerID of this record relates; Name, text of the response in the master language which is associated with the QuestionID of this record. A response record is provided for each response in the set of responses for each question. For example, if the question is "Do you own or rent you primary residence" and the set of responses is "Rent, Own, or Other," then three response records would exist for the question, one for each possible response, and each response record linked by QuestionID to the question record in the VoteQuestion table 39.

Referring to FIG. 3M, each record of the LangAnswer table 42 has the following data fields: LangAnswerID, a unique identifier for the record in this table; the LangID of one of the language records; the AnswerID of one of the response records; and Answer, the translated text of the response associated with the AnswerID of this record in the language associated with the LangID of this record.

Referring to FIG. 3N, each record of the Access table 43 (referred to as an access record) has the following fields: AccessID, a unique identifier for the record in the table; the CampaignID of one of the voting campaign records; the CategoryID of one of the country records; InUse, a bit, which when set to "1", indicates that the voting campaign is currently available for both voting and administration; RefName, a short name by which the voting campaign is identified for administration; FromWhere, the URL which voters will use to address the voting site for the voting campaign associated with the CampaignID of this record; and DefaultFlag, a bit which, when set to "1", indicates that this particular campaign is the one which the voter addresses when the reference URL to the site has no CampaignID specified. One record is present in the Access table 43 for each valid and accessible combination of voting campaign (CampaignID) and country (Category ID).

Referring to FIG. 3O, each record of the VoteLog table 44 (referred to as a VoteLog record) has the following data fields: LogID, a unique identifier for the record in this table; IPaddress, the IPaddress of a voter; the CampaignID of one of the campaign records; BrowserType, the type of browser software of the computer 18 of the voter; ReferringSite, the address of the site which sent the voter to the voting site of system 10; RegCookie, a Registration Digital ID generated by the network server 12 if the voter has registered with the system; CreateDate, the date when this record was created; OtherPolls, a list of the PollID of all surveys the voter has taken for the voting campaign of the CampaignID of this record; VoteCookie, a Voting Digital ID generated by the network server 12 used for determining when a voter has voted previously for a survey in a voting campaign; the AccessID of one of the access records for the voter of the voting campaign of the CampaignID listed in this record; and the ActionID of an action record, which is described below, indicating the last action taken by the voter at the voting site. One VoteLog record is provided for each voter under a voting campaign, and is updated each time the voter revisits a voting campaign to either vote on a new survey or review the results of previous surveys under the voting campaign.

Referring to FIG. 3P, each record of the ActionType table 45 has the following data fields: ActionID, a unique identifier for the record in this table; and Action, text referencing an action taken by a voter at the voting site, such as vote, or review summary.

Referring to FIG. 3Q, each record of the Tally table 46 has the following data fields: TallyID, a unique identifier for the record in this table; the PollID of one of the survey records; the CategoryID of one of the country records of Category table 32; the AnswerID of one of the response set records to which this record relates for the survey (PollID) and campaign (CampaignID) associated with this record; TallyCount, the total number of responses for the answer associated with the AnswerID listed in this record; and Value, text of the answered response entered by a voter if the question has a text input field. If the answered response is not a text input field, but a radio button or check box, the Value field may be null. Preferably, each response is provided with the AccessID for the voting campaign and LogID of the voter, however, this is not required.

Referring to FIG. 3R, each record of the QuestionTally table 47 has the following data fields: QuestionTallyID, a unique identifier for each record in this table; the QuestionID of one of the question records; the CategoryID of one of the voting category records; and QuestionTally, the total number of times the question (QuestionID) has been answered by voters for the country (CategoryID) associated with this record.

Figure 4:
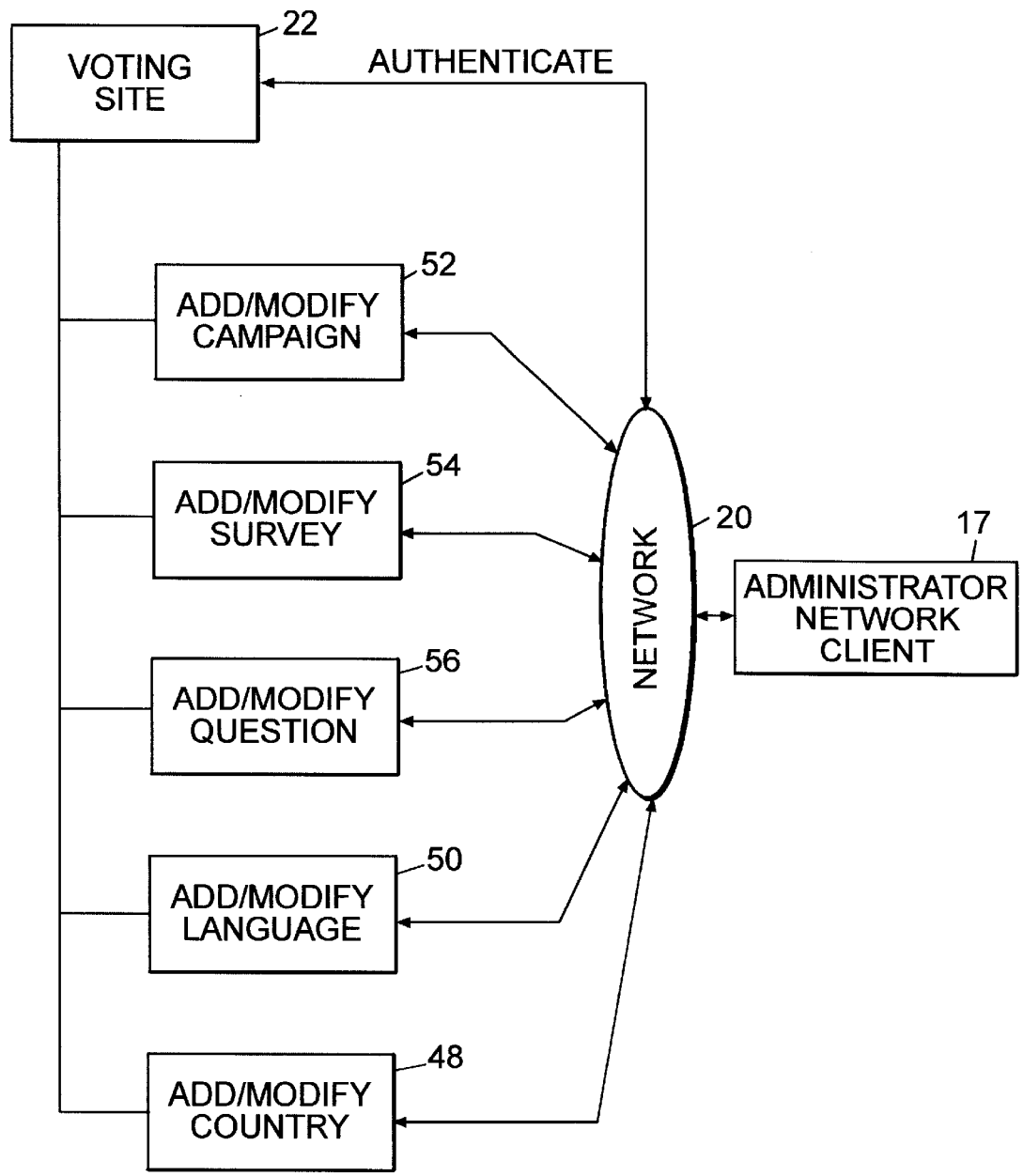
FIG. 4 is a block diagram of the administrative interface for the voting site of the system of FIG. 1.

Referring to FIG. 4, a block diagram of the administrative interface for the voting site of system 10 is shown for adding or modifying the voting information in database 15 relating to countries, languages, voting campaigns, surveys, questions and responses. An administrator, via their computer 17, can connect via network 20, or LAN 19 (FIG. 1), to the network server 12 at an IPaddress of the voting site assigned to the administrative interface of the voting site. The administrator's computer 17 after establishing a network connection to the administrative interface of the voting site, receives a page requesting a password to be entered, such that the administrator is authenticated by the system 10. Only authorized administrators have been assigned passwords. Entered passwords are compared to passwords stored in memory of the network server 12. If the password in valid, the administrator's computer 17 receives a page with the add/modify selections indicated by boxes 48–56, as shown in further detail in FIGS. 5–9, respectively.

Figure 5:
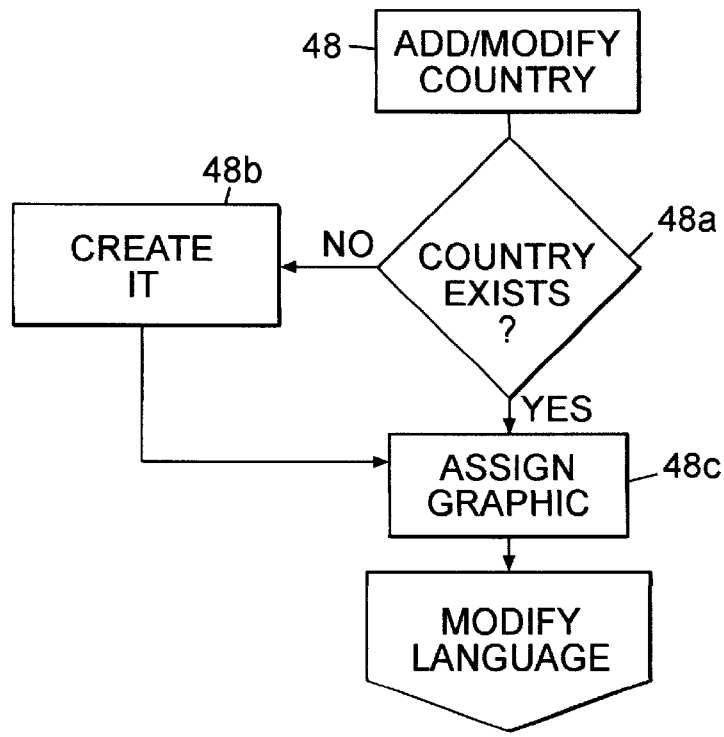
FIG. 5 is a flow chart showing the operation and programming of the Add/Modify Country block of FIG. 4.

Referring to FIG. 5, if the Add/Modify Country 48 is selected, a query page is provided at step 48*a* to the administrator's computer 17 allowing the administrator to check if a country exists by querying the country records of the Category table 32 (FIG. 3C). If the country does not exist, the query page may allow the user to select to create (add) a new country by receiving an add country page which has prompts for the information in the data fields as described earlier for a country record (step 48*b*). This includes assigning a graphic to identify the country (step 48*c*). If the county exists, a review or modify page having prompts with field having the information existing in the country record is sent to the administrator's computer 17. The information received from the administrator's computer 17 is applied by the network server 12 to the Category table 32, via the transaction server 16, to either add a new country record or modify an existing country record. After adding or modifying a country record, the network server 12 may branch to the Add/Modify language block of FIG. 6 to review or assign languages for the country.

Figure 6:
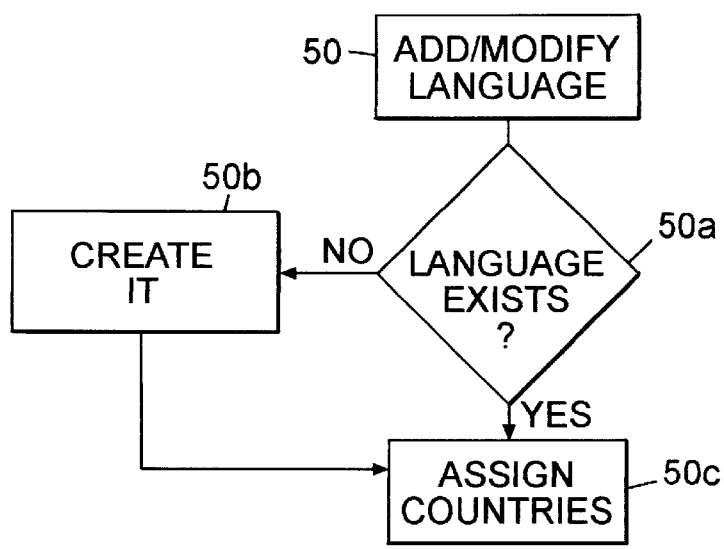
FIG. 6 is a flow chart showing the operation and programming of the Add/Modify Language block of FIG. 4.

Referring to FIG. 6, if the Add/Modify Language 50 is selected, a query page is provided at step 50*a* to the administrator's computer 17 allowing the administrator to check if a language exists by querying the question records of the Language table 31 (FIG. 3B). If the language does not exist, the query page may allow the user to select to create (add) a new language by receiving an add language page which has prompts for the information in the data fields as described earlier for a language record (step 50*b*). If the language exists in the Language table's records, a review or modify page having prompts with field having the information existing in the language record is sent to the administrator's computer 17. The information received from the administrator's computer 17 is applied by the network server 12 to the Language table 31, via the transaction server 16, to either add a new language record or modify an existing language record. After adding or modifying a language record, a page is sent to the administrator's computer listing any records in the LangCategory table 34 (FIG. 3E) for all countries (CategoryID) assigned to the language (LangiD) and allowing the administrator to add or modify assignments of the language to countries (step 50*c*).

Figure 7:
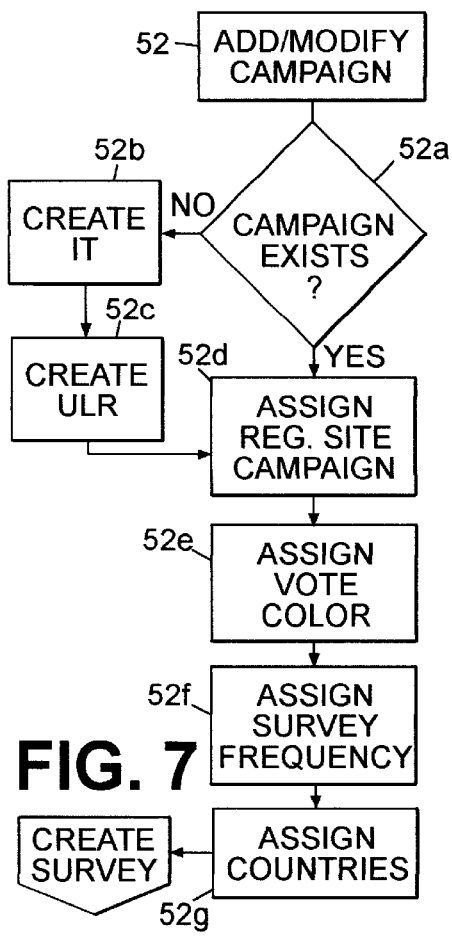
FIG. 7 is a flow chart showing the operation and programming of the Add/Modify Campaign block of FIG. 4.

Referring to FIG. 7, if the Add/Modify Campaign 52 is selected, a query page is provided at step 52*a* to the administrator's computer 17 allowing the administrator to check if a voting campaign exists by querying the voting campaign records of the VoteCampaign table 30 (FIG. 3A). If the voting campaign does not exist, the query page may allow the user to select to create (add) a new campaign by receiving an add voting campaign page which has prompts for the information in the data fields as described earlier for a campaign record (step 52*b*). The add voting campaign page enables the administrator to define the display characteristics providing a desired look and feel for the voting campaign are provided by the administrator by storing (or downloading) files to the network server 12 at a location in the database 15. In the add voting campaign page, the network server automatically creates a unique URL for the new voting campaign, such that a voting campaign is accessed by a voter by requesting a connection to the network server 12 at this URL (step 52*c*). The URL is stored in the ReferrLink data field of the vote-campaign record. The administrator may then assign a link to the registration site. When a registration campaign is created (added), a network site address (URL) is created by and on the network server 12. The creation of a registration campaign is described later in the description of the registration site is administrative interface. This URL is returned as information to the administrator at the registration site's administrative interface, who may record it for future reference. It is this URL which the administrator may provide to store in the ReferrLink field to assign a registration campaign (step 52*d*). It accomplishes the hyperlinkage between the voting site and the associated registration campaign at the registration site, if desired. If the voting campaign exists, a review or modify page having prompts with field having the information existing in the campaign record is sent to the administrator's computer 17. The information received from the administrator's computer is applied by the network server 12 to the VoteCampaign table 30, via the transaction server, to either add a new campaign record or modify an existing campaign record. After adding a voting campaign record, a page is sent to the administrator's computer with a prompt to select a color, from a list for the background colors for the voting campaign. If modifying a voting campaign record, the color for the campaign in the record of the VoteCampaign table 35 is shown on this page (step 52*e*). The frequency of the survey is assigned by having the DisplayLength field of the voting campaign record set to the number of days each survey of the voting campaign will be available for voting after the StartDate of the campaign record (step 52*f*). Next, another page is sent to the administrator's computer 17 listing all countries (CategoryID) for any records in the CampaignCategory table 34 assigned to the voting campaign (Campaign ID) and allowing the administrator to add or modify assignments of the campaign to countries (step 52*g*). The information received from the administrator's computer 17 is applied by the network server 12 to the CampaignCategory table 34 and VoteColor table 35 via the transaction server 16. For each new combination of voting campaign (CampaignID) and country (CategoryID), the network server 12 directs the transaction server to create a record in the Access table 43. The network server may branch to the Add/Modify Survey of FIG. 8 to create a survey.

Figure 8:
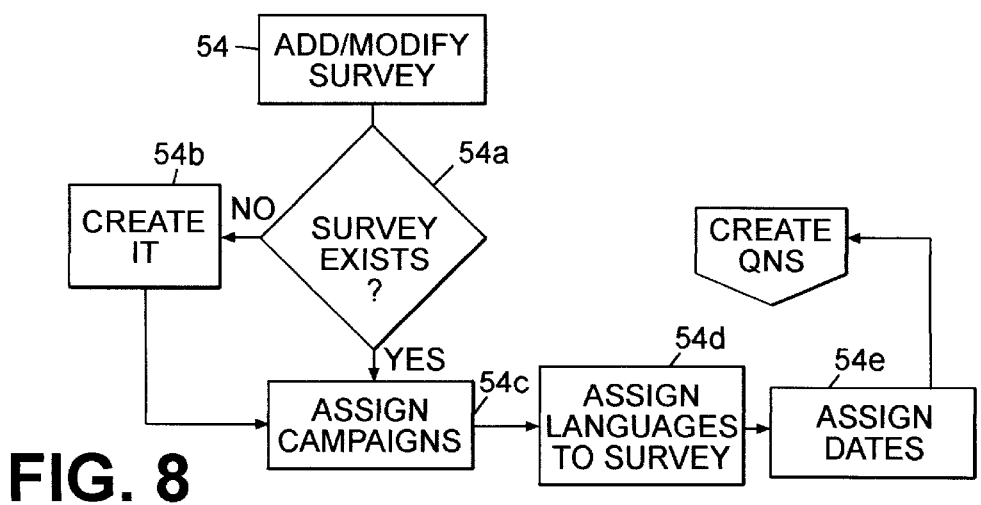
FIG. 8 is a flow chart showing the operation and programming of the Add/Modify Survey block of FIG. 4.
Figure 10:
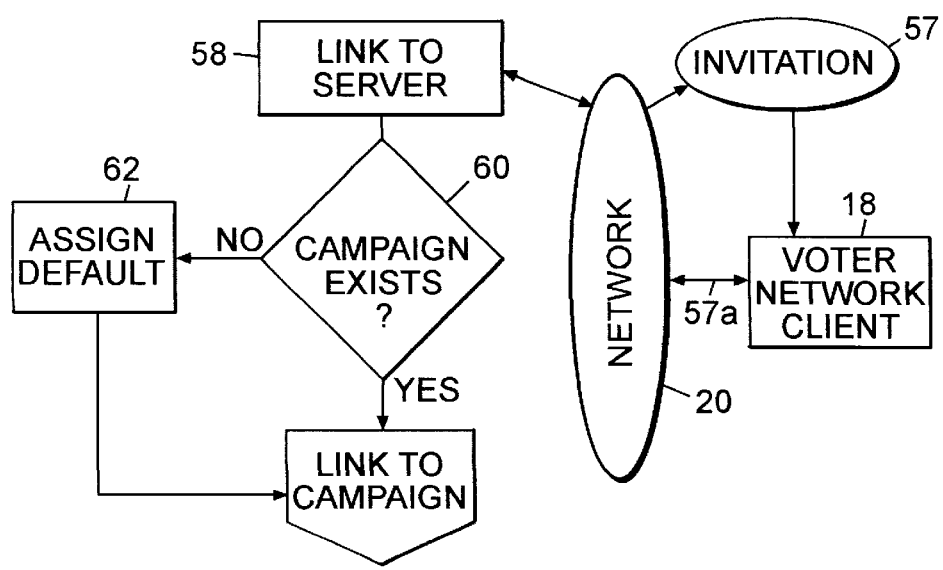
FIGS. 10, 11, 12, 13, and 14 are connected flow charts showing the operation and programming of the voting site of the system of FIG. 1 during a network transaction with the computer of a voter, which enables a voter to vote on a survey and receive a summary of the survey results.
Figure 11:
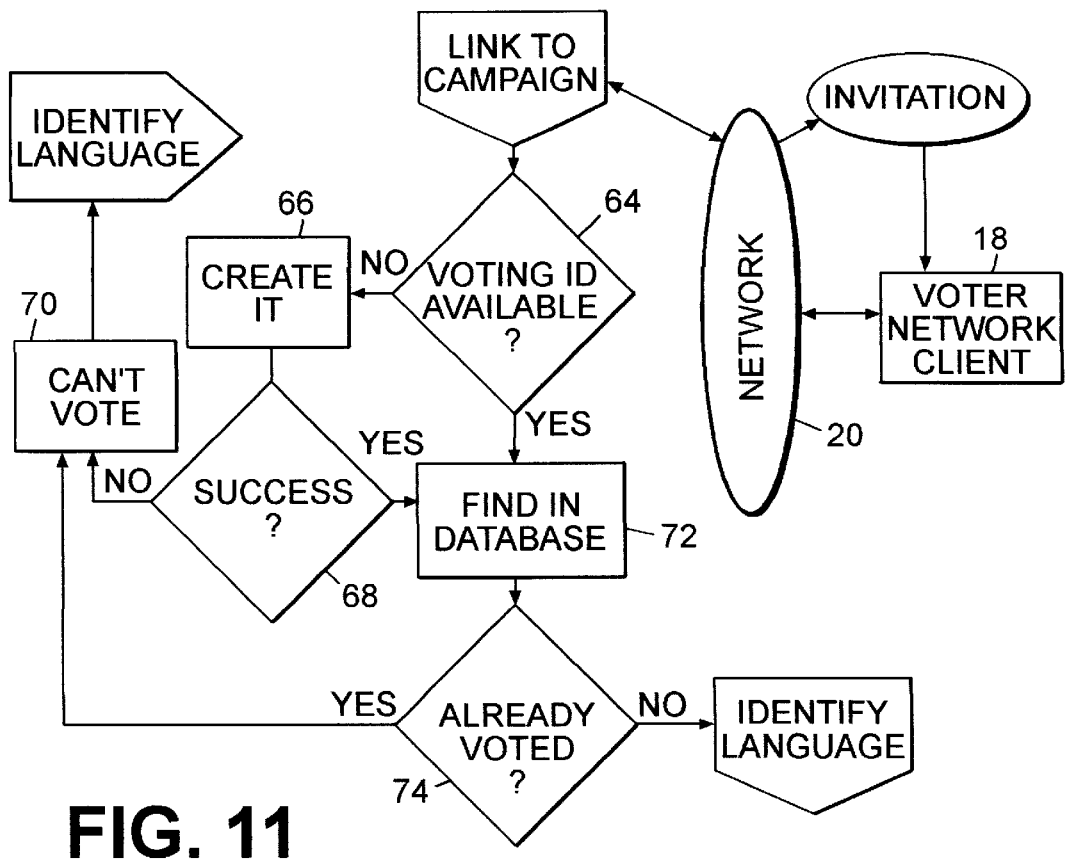

Referring to FIG. 8, if the Add/Modify Survey 54 is selected, a query page is provided at step 54*a* to the administrator's computer 17 allowing the administrator to check if a survey exists by querying the survey records of the Poll table 36 (FIG. 3G). Typically, the records are queried by CampaignID, and if multiple surveys are defined for the campaign, they appear as defined by the PollOrder field of each survey record. If the survey does not exist, the query page may allow the user to select to create (add) a new survey by receiving a page for adding a survey which has prompts for the information in the data fields as described earlier for a survey record (step 54*b*). The voting campaign is assigned to the survey via the CampaignID field of the survey record (step 54c), and the start date of the survey is assigned via the PollDate field of the survey record. If the survey exists in the Poll table's records, a review or modify page having prompts with field having the information existing in the survey record is sent to the administrator's computer 17. The information received from the administrator's computer is applied by the network server 12 to the Poll table 36, via the transaction server 16, to either add a new survey record or modify an existing survey record, and related records in the LangPoll table 37. In addition, the administrator may assign additional languages to the voting campaign by a prompts in the add page, or review or modify page, to select from a language from a list based on the records of Language table 31 (step 54d). Records are added or modified in the LangPoll table 37 according to such language(s) selected. The network server may branch to the Add/Modify Question of FIG. 9 to create questions for the survey.

Figure 9:
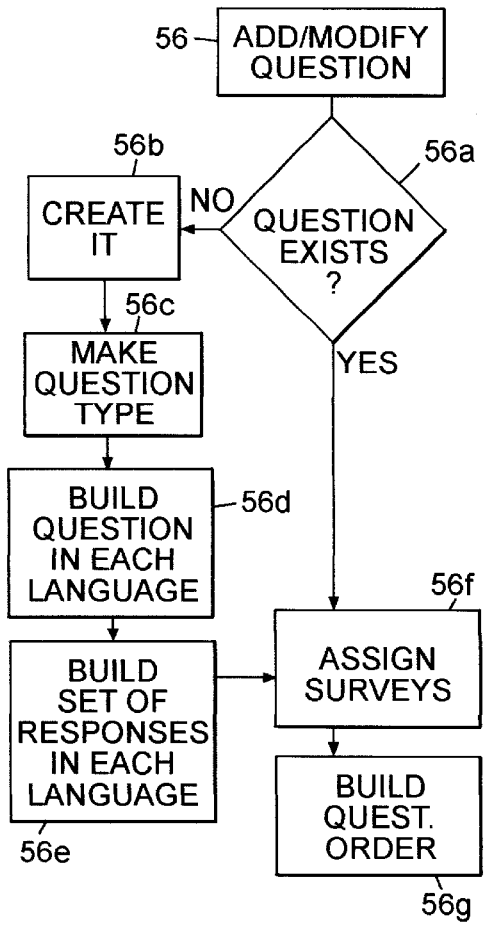
FIG. 9 is a flow chart showing the operation and programming of the Addl Modify Question block of FIG. 4.

Referring to FIG. 9, if the Add/Modify Question 56 is selected, a query page is provided to the administrator's computer 17 allowing the administrator to check if a question exists by querying the question records of the VoteQuestion table 39 (FIG. 3J). If the question does not exist, the query page may allow the user to select to create (add) a new question by receiving add question page(s) which has prompts for the information in the data fields as described earlier for each question record, the responses to the question, and the information in the data fields as described earlier of a record in the QuestionType table 38 of FIG. 3I (steps 56b and 56c). For each language associated with a survey record (PollID) in the LangPoll table 37, the administrator is also prompted for the question in each language (step 56d), and the responses to the question in each language (step 56e). The survey (PollID) is assigned to the question (step 56f), the question's order relative to other questions already assigned to the survey in the VoteQuestion table 39 (step 56g). If the question exists in the VoteQuestion table's records, a review or modify page having prompts with field having the information existing in the question record, and in related records of the VoteAnswer, LangQuestion, LangQuestion, LangAnswer, and QuestionType tables, is sent to the administrator's computer 17. The information received from the administrator's computer is applied by the network server 12 to the VoteQuestions table 39, via the transaction server, to either add a new question record or modify a question record, and any of the related tables.

Referring to FIGS. 10–14, a flow chart of the operation and programming of the network server 12 when connected to one of the voter's computer 18, i.e., a network client computer, is shown. The computer 18 links to the network server 12 by either a direct connection, indicated by bidirectional arrow 57a, or through an invitation 57b (step 58). As each defined voting campaign in the system 10 has a URL having a query string identifying the campaign, an invitation 57b may be a hyperlink to a URL of a voting campaign embedded in a page offered by another site to a network client computer 18 or contained in E-mail, otherwise a voter must obtain the URL from either a referral by another person, a new source, or a published or broadcasted solicitation to vote on surveys of a particular voting campaign. Once a network client computer 18 has established a session, the network server 12 checks if the campaign exists by queries the vote-campaign records of the VoteCampaign table of the database 15, via the transaction server, matches the URL used by the network client in any of the ReferrLink fields of the vote-campaign records (step 60). If so, and if the Active field of the vote-campaign record is set to active, the network server 12 branches to FIG. 11, otherwise, a default voting campaign URL is assigned (step 62) before branching to FIG. 11. The default voting campaign is located by querying the records of the VoteCampaign table 30 (FIG. 3A) for the record having a set Default Flag and retrieving the CampaignID of that record, representing the the campaign having the default URL, and locating the associated record in the Access table. The default voting campaign is used to allow a voter to vote for a general, topical voting campaign defined in database 15. Thus, a vote-campaign record for the voting campaign has been established for the voter which defines this voting session's CampaignID.

Next, the network server 12 checks if any Voting Digital IDs are available by requesting the browser of the network client computer 18 for any digital ID, commonly referred to as cookies, having data indicating that they were sent to the browser by the voting site of the network server 12 in a previous session with the network server (step 64). If no Voting Digital ID is available, the network server attempts to create the Voting Digital ID identifying the voting site of the network server, the CampaignID, and the PollID of that survey record located in the PollID table having this session's Campaign ID which is active and has the latest PollDate equal to or before the current date maintained at the network server (step 66). The attempt is successful if the network server can store the Voting Digital ID at the browser (step 68), otherwise the voter cannot vote (step 70). The system requires that cookies be allowed to be stored at a browser of computer 18, such that the network server 12 can determine if the voter has already voter for survey(s) in the campaign. If a Voting Digital ID was available at step 64 or successfully created at step 68, then the network server 12 queries the VoteCookie field in the records of the VoteLog table having the session's CampaignID for a matching record (step 72). At step 74, if no record is found in the VoteLog table, one is created for the voter in the VoteLog table 44, which indicates that the voter and thus has not yet voted. The information for the new record of the VoteLog table is provided by the browser of computer 18, in particular, the IPaddress of the computer 18, BrowserType, Referring Site, and CreateDate. However, at step 74, if a record in found in the VoteLog table and a VoteCookie matches the Voting Digital ID associated with present survey and voting campaign, then the voter has already voted and cannot vote again (step 70). The record found in the VoteLog table is revised based on the information provided by the browser of computer 18 to update the Referring Site field of the record. Thus, network server 12 can determine if a voter has voted previously on a survey under a voting campaign. The network server 12 branches either from step 70, or step 74, to FIG. 12 to identify the preferred language of the voter.

Figure 12:
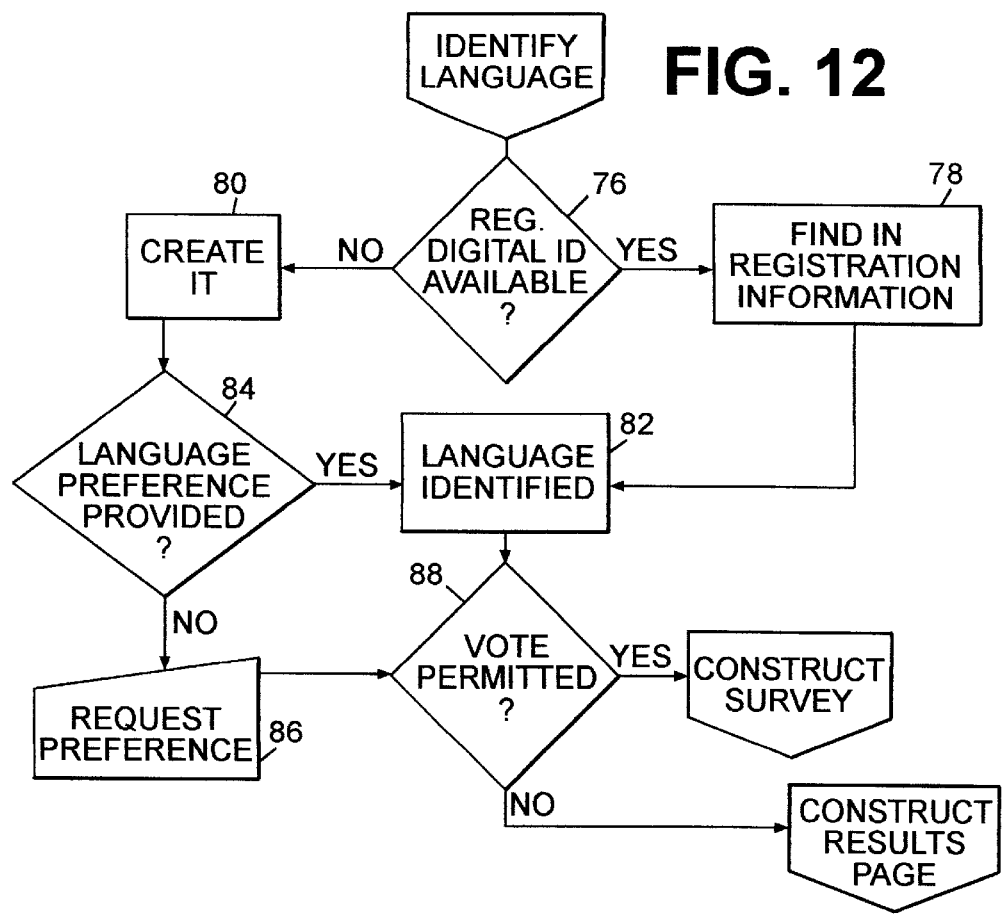

Referring to FIG. 12, the network server 12 check if another cookie called the Registration Digital ID is stored at the browser of the network client computer 18 by requesting for any cookies sent previously to the network client computer by the registration site of the system 10 (step 76). If so, the Registration Digital ID is located in a record in the registration tables storing registration information (step 78), i.e., if the voter has registered with system 10, the record in the Cookie field of the Users Table having the Registration Digital ID is located and then linked to the record in RegistrationData Table which contains the preferred language of the voter in its LangID field, as will be described later in connection with FIGS. 16O and 16V. If no Registration Digital ID is available at step 76, then the network server 12 creates one at step 80, and stores it in the record of the VoteLog database for the voter and in a record of the Registration tables. The network server 12 then checks the browser of the network client computer if any language preference is provided (step 84). Certain types of browser software, such as Netscape Navigator 4.0, may have a setting for a language preference which can be obtained by a request from a network server. If the browser uses pre-defined codes to represent different language, an additional language lookup table stored in database 15 may be used by the network server 12 to identify the LangID of the language returned from the browser. If a language preference is identified at step 84, or at step 78 through the records of the registration information based on the Registration Digital ID, the language record associated with this language is found in the Language table 31 (FIG. 3B). If no preferred language is provided by the browser of the network client computer 18, the network server 12 prepares a page based on the language records of the Language database with the stored names of each language and the language graphic enabling the voter to select one of the languages as the preferred language (step 86). Also at step 86, the network server 12 checks if there is a match between the PollID and the selected language's LangID of the LangPoll table 37. If a match is not found, the survey is built from the default language as specified in the DefaultLangID field of Poll table 36. From either step 86 or step 82, the network server checks if the voter is permitted to vote, as determined previously at steps 70 or 74. If so, the network server branches to FIG. 13 to construct a survey, otherwise the network server branches to FIG. 14 to construct a results page.

Figure 13:
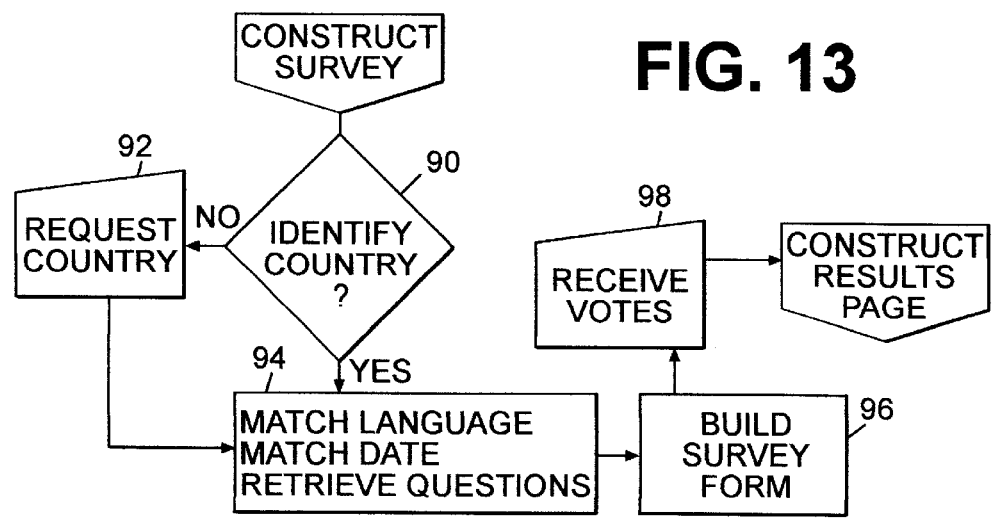
Figure 13A:
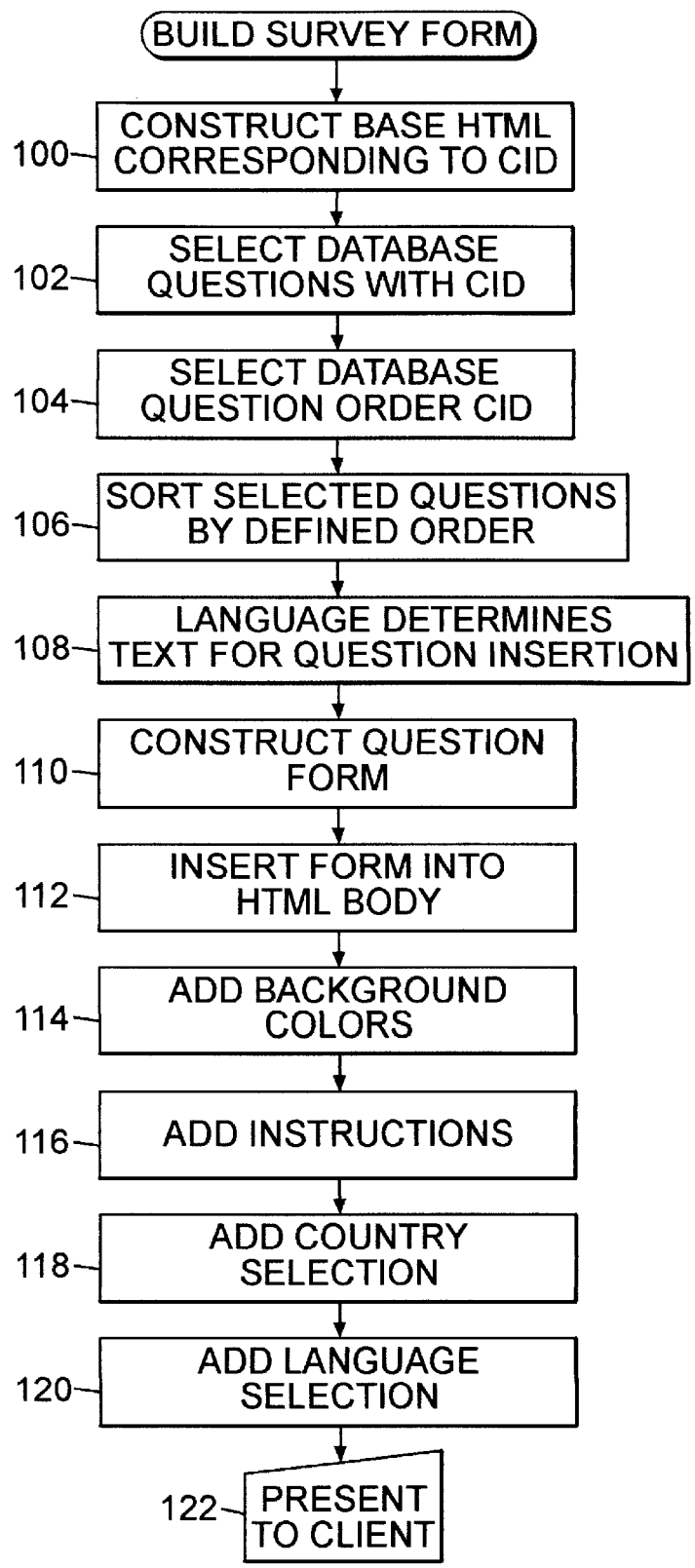
FIG. 13A is a flow chart showing the operation and programming of the Build Survey Form block of FIG. 13.

Referring to FIG. 13, the identify of the voter's country is determined by either the network server locating the country of the voter in the records of the registration tables by the Registration Digital ID at (step 90), or the network server preparing a page which lists all the countries of the voting-campaign for the voter to select one of the countries. This is achieved by first querying the records of the CampaignCategory table 33 (FIG. 3D) to identify the CategoryID's of each of the countries under the session's CampaignID (i.e., voting campaign), and then for each Category ID locating the name of the country. The network server 12 than dynamically builds the survey by locating a survey in the survey records of the Poll table 36 (FIG. 3G) having the session's CampaignID, which has its active bit set and has the lowest value in the PollOrder field. Based on the PollID of the survey record, the network server retrieves all the records of the VoteQuestion database 39 (FIG. 3J) having the PollID. The building of a survey form is shown in FIG. 13A. First, at step 100, a base HTML body is constructed for the survey form page corresponding to the CampaignID (referred to as CID in FIG. 13A). The layout of the page is located at a template for the voter's language LangID in memory from the DirectoryName of the voting-campaign record with any background, logos, hyperlink buttons, or other display characteristic in the voter's language. The color of the text is located in the record of the VoteColors database having this session's CampaignID. Based on the PollID of the survey record, the questions are selected (retrieved) from the VoteQuestion database 39 (FIG. 3J) for the survey (step 102). Of the question records selected, the order of the questions is identified by the QuestionOrder field in the records (step 104) and then sorts by the defined order (step 106). The text of each of the questions in the voter's preferred language LangID is located in the records of the LangQuestion table 40 (FIG. 3K) by the QuestionID associated with each of the questions (step 108). For each question, the response records in the VoteAnswer database 41 are located by the QuestionID of the question, and then the text of the answer in the voter's preferred language LangID is located in the records of the LangAnswer table 42 (FIG. 3M) by the AnswerID of the response record.

At step 110, each question is then constructed by first providing the text of question and the set of responses for the question in the voter's preferred language. The input template for each of the responses to the question is determined in accordance with each question's associated record in the Questiontype table 42. The input template is based on the identifier Name field of this record which identifies for the responses to the questoin a desired input graphic, which may be a "radio" button, a box onto which a voter clicks, or a field into which a numerical range or text may be inputted. The network server includes memory which stores a lookup table to associate each identifier in the Name field with the HTML display graphic for the responses to the question. then, at step 112, the questions in the order defined by step 106 are coded in HTML and inserted in the base HTML body of the page constructed at step 100. The background color is in accordance with the record of the VoteColor table 35 for the session's CampaignID (step 114). The survey instruciton in the voter's preferred language LangID for the survey PollID is located in the records of the LangPoll table 37, and added at the top (PollName) and bottom (PollClose) of the HTML page (step 116). A selection of countries is then added to the bottom of the HTML page (step 118). The countries (CategoryID's) for the campaignID. The names for each country are then found in the records of the Category table 32 based on each located country's CategoryID. A selection of laguages is then added to the HTML page (step 120. The LangIDs for each country's CategroyID are located in the LangCategory table, and then the language records for the located LangID's are found in the Language table 31 (FIG. 3B). Preferably, the languages may be selected from a list of graphics, one for each language, from the LangGraphic field of the associated laguage records. Teh list may be at the top of the survey from page. In response to a voter selecting a language, the network server 12 provides a new survey form page in the selected language by repeating steps 100–120 based on the selected language's LangID. The survey form page allows the user to select the country and language for use in the later construction of the results page. An example of a survey form page 29 sent to a voter's computer is shown in FIG. 2B with questions 29a and 29c, their responses 29b and 29d, respectively, and PollName 29f and PollClose 29g (the selection of countries or languages is not shown in this example). The insertion of information at step 112, 116, 118 and 120 may be facilitated by the use of tags in the HTML body provided at step 100 into which the HTML code may be inserted. The survey form page is then sent to the network client computer 18 (step 122). Referring back to FIG. 13, the network server 12 waits to receive the votes to each set of response for each question (step 98) before branching to step 124 of FIG. 14, the results page may also be constructed if the voter was not permitted to vote at step 88 of FIG. 12.

Figure 14:
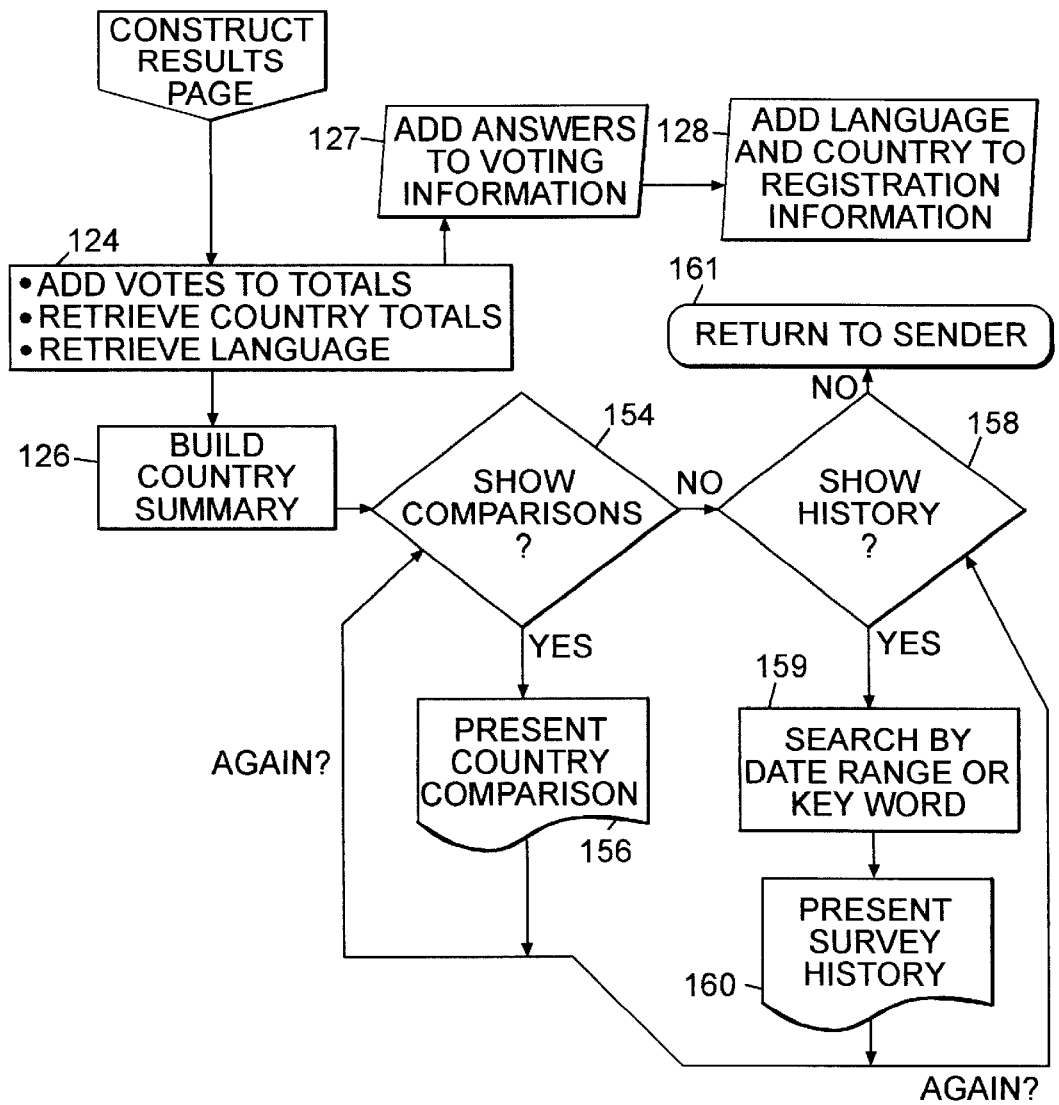

Referring to FIG. 14, at step 124 for each answer received, it is associated with the AnswerID of a response record and then tallied (index by one) the vote totals (TallyCount) of the associated record in the Tally table 46 for the country identified at either step 90 or 92. For each question answered, the Question Tally field of the Question Tally record associated with the question for the voter's country is indexed by one. Also, the actual answers are stored in the Value field of each associated Tally record with the LogID (or AccessID) associated with the voter (step 127). If the voter has registered with the system 10, and the language and country of the voter may be added to the registration information (i.e., record(s) in the RegistrationData table which stored voter's country and language in the Answer and LangID fields, respectively, as described later in connection with FIGS. 16O and 16V) stored in the database 15 for the voter (step 128).

Figure 14A:
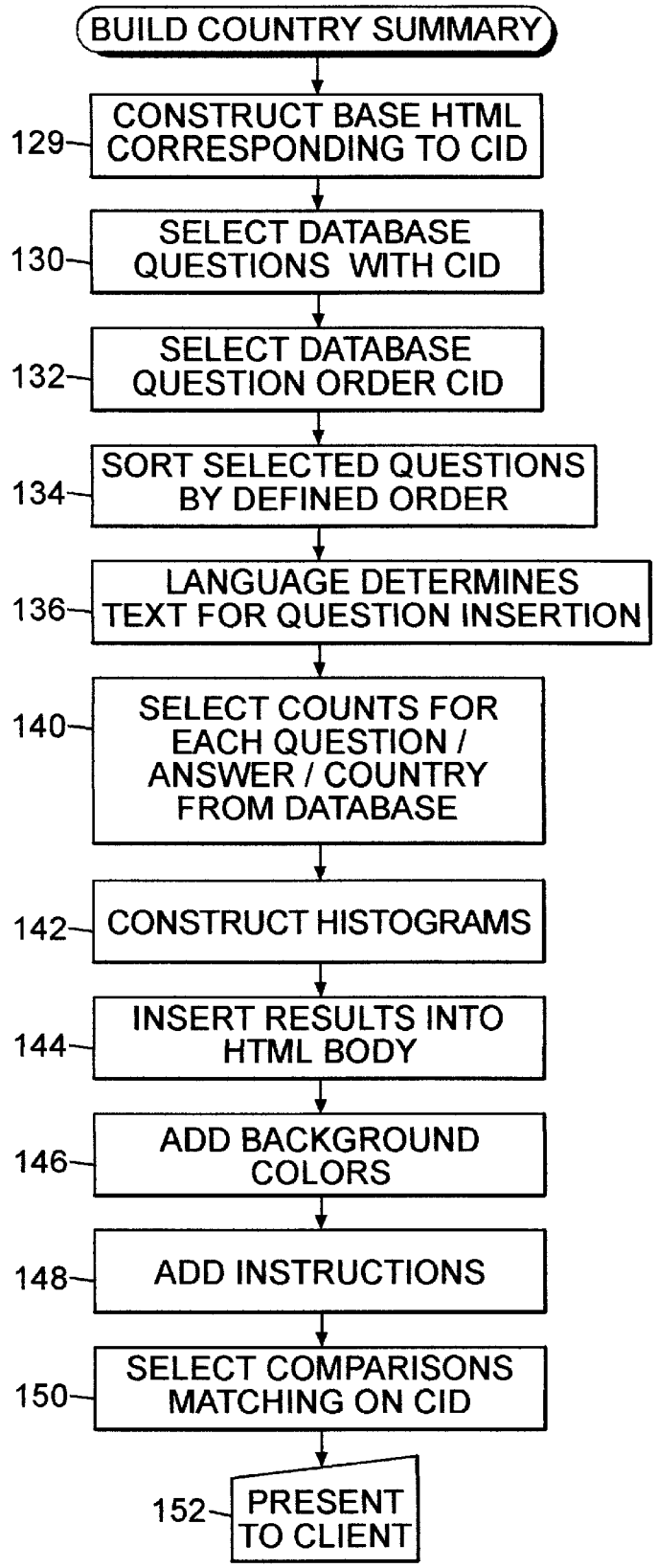
FIG. 14A is a flow chart showing the operation and programming of the Build Country Summary block of FIG. 14.
Figure 14B:
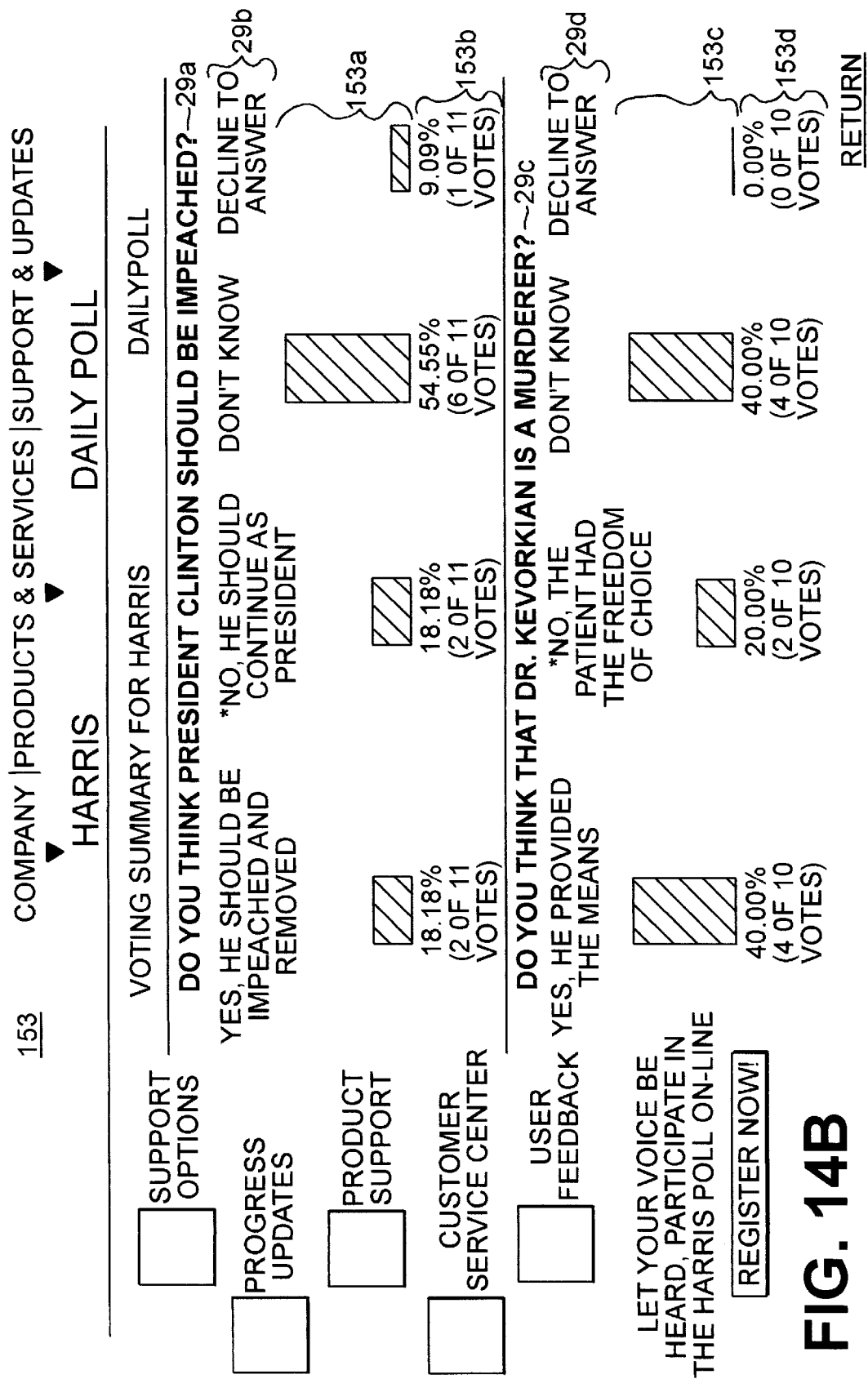
FIG. 14B is an example of a results page with a country summary of a voting campaign corresponding to the survey in the example of FIG. 2A.

Next, a County Summary in constructed on a results page at step 126 for the country of the voter, as shown in FIG. 14A. Steps 129–136 are identical to step 100–108 of FIG. 13A. The totals for the records of the QuestionTally table 47 for each question's Question from the survey are retrieved for the CategoryID of the country selected by the voter via the survey form page. Similarly, the totals (TallyCount) for the CategoryID of the country selected by the voter for each AnswerID of the responses for each question of the survey in the Tally table are retrieved. For each set of responses for each of the questions of the survey, both a histogram and percentages are calculated in accordance with the retrieved value from the value for QuestionTally for the question for the selected country and the retrieved values for the TallyCount for each response in the set of responses for the selected country (step 142). The results are inserted in the body of the HTML page from step 129 having the question form which is similar to that on the survey with the calculated histogram values next to the responses for each question. The background color is in accordance with the record of the VoteColor table 35 for the session's CampaignID (step 146). The instruction in the voter's preferred language LangID for the survey PollID is located in the records of the LangPoll table 37, and added at the top (PollName) and bottom (PollClose) of the HTML page (step 148). A selection of other countries of the campaign is listed at the bottom of the page to allow the voter to select another country for comparison purposes (step 150). The listed countries (CategoryID's) for the campaign are located using the records of the CampaignCategory table 33 having the session's CampaignID. The names for each country are then found in the Category table 32 based on located country's CategoryID. The results form page is then sent to the network client computer 18 (step 152). An example of a results page 153 providing a summary of the survey 29 of FIG. 2A is shown in FIG. 14B, where histogram 153a and percentages 153b are below question 29a and responses set 29b, and histogram 153c percentages 153d are below question 29c and response set 29d. Other graphichs showing summary, such as pie charts, may similarly be used to show the results.

Referring back to FIG. 14, if the voter selects a comparison for a fifferent country via the results form page (step 154), a results form page for that country is formed by repeating steps 129–152 for the different country CategoryID under this session's CampaignID (step 156). The voter can select different countries for comparison by brancing back to setp 154. Optionally, the results page form shows under each question, the histogram and percentages of both the voter's country and the selected different country for each of the responses, such that the voter can compare the results of the two countries to the survey. Otherwise, via link (i.e., hyperlink button) on the results form page, a history of other surveys may be selected and presented to the voter. After step 154, the voter may optionally select to view any of the results of previous surveys that were offered as part of the current voting campaign (step 158). If selected, a search engine is invoked that allows the voter to select a question from previous surveys by specifying a date range (for example, querying the PollDate field of the survey records for the campaign) or a set of keywords (for example, querying the Question field of LangQuestion table 40 records and then associating the questions with the survey's PollID via the VoteQuestion table 39 records) (step 159). If successful, the search returns (step 160) the results in the same format as step 124, allowing for country comparasions (step 156) among the historical data for the results of the survey. Step 158 is repeated until the voter presents no additional queries. In this manner, voters can search a history of completed surveys for a voting campaign, and obtain the results of such completed survey in their language. Finally, the voter is returned (linked) to the site which sent the voter to the voting site (step 161). The address of the site is stored in voter's record for the VoteLog table 30, which was created or modified with the ReferringSite address at step 74.

The network server 12 is programmed to provide for automatic roll over of the survey in each of the voting campaigns based on the StartDate and DisplayLength of their respective campaign records in the VoteCampaign table 30, such that at each successive interval of the days defined by the DisplayLength from the StartDate, the survey of the campaign is automatically updated by the network server 12 in accordance with the PollOrder field of each of the survey records defined for the campaign. In other words, for each voting campaign, at the end of each DisplayLength interval, the next survey in poll queue will be used as the survey for the campaign. The field of this survey may be set to active to identify the survey during future transactions with voters' computers. For example, if the DisplayLength was set to "1" for a voting campaign, then the surveys for that campaign would automatically roll over every day at a preset time, preferably at the anticipated time of minimal network server load, such as 4 PM. The administrator should define the surveys for each of the voting campaigns in advance, such that new surveys are provided when the DisplayLength interval for the voting campaign expires. The network server 12 at the end of each such interval, modifies the survey record for the previous survey by setting the active field to non-active, and the PollDate field to the last date the survey was available for voting. Although the survey is complete, such surveys are maintained at the database, such that voters can review the results at steps 159–160.

Referring back to FIG. 1, in addition to enabling voting on surveys in multiple campaigns at voting site 22, system 10 allows voters, or other registrants, to register under one of multiple registration campaigns through a registration questionnaire at registration site 24. Similar to a voting campaign, each registration campaign has an assigned URL. An embedded hyperlink to a particular URL of an associated registration campaign may be provided in the results page provided by the voting site, such that a voter at the voting site may link (connect) to the associated registration campaign at the registration site. The registration campaigns at the registration site operate independently of voting campaigns in system 10, but provide a means of obtaining registration information about voters which may be used to later solicit voters to a particular voting campaign, such as by E-mail with a hyperlink to the URL of a voting campaign. Similar to a voting campaign, the URL of a registration campaign may be in an embedded hyperlink offered to a visitor of another site on the network. If an embedded hyperlink at another site (referred to as the sender site) is selected by the user at that site, the user is connected to a particular registration campaign at the registration site of network server 12 which may have the same display characteristics, i.e., look and feel, as the pages of the sender site. Registration involves the network server sending to a user a registration questionnaire page for a registration campaign dynamically constructed in accordance with the registration information stored in the database 15, and receiving and storing the answers to the registration questions on the questionnaire. When registration is complete, the registration site may return the user to a connection with the sender site. The registration may be later modified by a user reconnecting to the registration site at the URL of a registration campaign.

The terminology used in describing the registration site of system 10 is identical to that used in description the voting site, except that a registration questionnaire represents an ordered list of registration questions directed to obtaining registration data on the voter, and a questionnaire form page represents a document having a registration questionnaire for a registration campaign. The term registrant is used generally to describe any user, such as voters described earlier, which establishes a network connection to the network server 12 through their computer 18 for registering under one of the multiple registration campaigns of the registration site.

Figure 15:
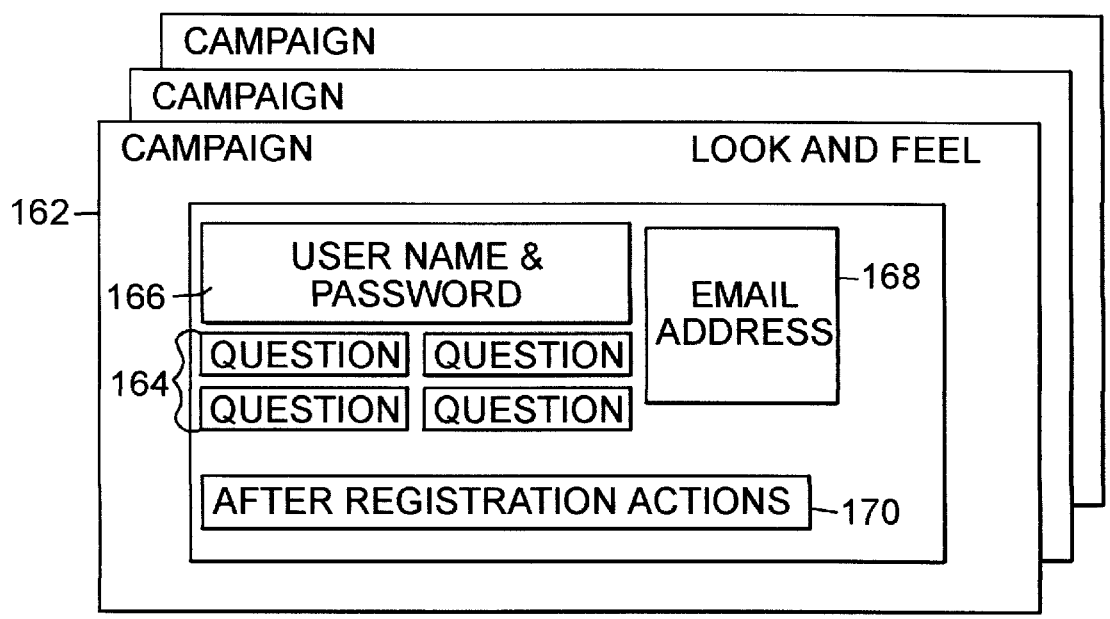
FIG. 15 is an illustration of the multiple campaigns of the registration site of the system of FIG. 1.

Referring to FIG. 15, an illustration of the elements of a registration campaign 162 is shown. The registration campaign includes a registration questionnaire having several questions 164, the user name and assigned password of the registrant 166, the E-mail address of the registrant 168, and any after registration actions, such as linking the registrant to the sender site, or another desired network site.

Multiple records in tables of database 15 store registration information. The registration information includes records stored in twenty-two tables 172–193, as shown in FIGS. 16A–16V. The Campaign table 172 defines the registration campaigns for the registration site of system 10. The Language table 173 defines the languages available in system 10, and may be the same table as Language table 31 (FIG. 3B). The LangCampaign table 174 links the records of the Campaign table 172 to records in the Language table 173 to define the different languages available for each registration campaign. The SurveyLink table 175 provides an identifier, SurveyID, for the questionnaire of each registration campaign. The LangSurvey table 176 links the records of the SurveyLink table 175 to the records of the Language table 173 to define the different languages available for each registration questionnaire. The Questions table 177 defines the registration questions in system 10 in the master language. The CampaignQuestion table 179 links the records of the Campaign table 172 with the records of the Questions table 177 to define the registration questions for each registration campaign. The QuestionType table 178 defines the type of response sets for each of the registration questions. The CampaignQuestion table 179 links the records of the Campaign table 172 with the records of the Questions table 177 to define the registration questions for each registration campaign. The LangQuestion table 180 defines the translations of each registration question in different languages. The SubQuestion table 181 defines the responses to the registration questions in the master language. The ValidationData table 182 defines a minimum and maximum numerical range if a response to a registration question has a numerical answer. The LangSubQuestion table 183 defines the translation of the responses to a registration question in different languages. The CampaignSeparator table 184 defines the separator tags to be placed between registration questions of a registration campaign, where each record in this table 184 is linked to a record of the SeparatorType table 185 to define the HTML code of the separator tag. The Users table 186 defines information about each registrant connecting to the registration site under a UserID assigned to each registrant. The CampaignUser table 187 links the records of the Users table 186 to the records of the Campaign table 172 to define the registration campaigns in which each registrant has participated. The UnsubscribeData 188 defines information relating to why a registrant elected to unsubscribe to the registration site. The Transactions table 189 logs each registrant when they connect to the registration site and perform an action which affects their stored registration data. The ActionType table 190 define the different actions a registrant may perform at the registration site, such as completing a registration questionnaire or modifying a registration questionnaire. The InitialAccess table 191 defines information for each registrant when a registrant first connects to the registration site. The Access table 192 defines additional information for each registration campaign and is used for administrative purposes to maintain the campaign. The RegistrationData table 193 stores the answers to the responses to the registration questionnaire from each registrant, and includes additional information about the language used to provide the answers. The relationship of the records in the tables will become more apparent in the later description of the administrative interface and a transaction between the network server 12 and a connected voter/registrant's computer 18 at the registration site.

Referring to FIG. 16A, each record of the Campaign table 172 (referred to as a registration campaign record) has the following data fields: CampaignID, a unique identifier for each registration campaign; Name, the name of the registration campaign in the master language; BeginDate, the date the registration campaign is set to start; Active, a bit indicating if the registration campaign is active "1" or non-active "0"; ReferringSite, the URL (network address) assigned for the registration campaign; SurveyID, an identifier to a record in the SurveyLink table 175 which is associated with the registration questionnaire for the registration campaign; DirectoryName, the location in memory of the network server 12 or database 15 of file(s) representing page templates, in each of the different languages defined for the campaign in the LangCampaign table 174, storing all other information to included on each page of the registration campaign, such as borders, font type, font size, logos, or other display characteristics to provide a desired look and feel to the pages of the registration campaign; and ThankYouURL, the URL (network address) in memory of the network server 12 or database 15 storing a page template in each of the different language LangIDs, as defined for this campaign in the records of the LangCampaign table 174, such that a thank you message in the registrant's language may be sent to a registrant after registering with the campaign.

Referring to FIG. 16B, each record of the Language table 173 has the data fields described earlier in connection with Language table 31 (FIG. 3B): LangID, Language, LangGraphic, LangRefName, LangCodePage, and LangCID. The Language table used by the voting and registration site may be the same or a different table.

Referring to FIG. 16C, each record of the LangCampaign table 174 has the following data fields: LangCampaignID, a unique identifier for each record of this table; the LangID of one of the language records in the Language table 173; the CampaignID of one of the registration campaign records in the Campaign table 172; and Campaign, the location in memory of database 15 having the registration instructions in the language associated with the LangID of this record.

Referring to FIG. 16D, each record of the SurveyLink table 175 has the following data fields: SurveyID, a unique identifier for each record in this table; Name, the name of a questionnaire; URL, the URL (network address) to a follow-up link to send a registrant to after registering, such as the address of a voting campaign survey at the voting site, or other site as defined for the registration campaign associated with the SurveyID of this record; and Active, a bit indicating if the questionnaire of a registration campaign associated with this record is active "0" or non-active "1".

Referring to FIG. 16E, each record of the LangSurvey table 176 has the following data fields: LangSurveyID, a unique identifier for each record of this table; the LangID of one of the language records in the Language table 173; the SurveyID of one of the records of the SurveyLink table 175; and Survey, the name of the questionnaire (identical to the Name field of the associated record of the SurveyLink table).

Referring to FIG. 16F, each record of the Questions table 177 (referred to as a registration question record) has the following data fields: QuestionID, a unique identifier for each registration question record in this table; Question, the text of the registration question in the master language; QuestionTypeID, an identifier to the QuestionType table 178 indicating the type of answer to the question; Name; a name used to refer the question for administrative purposes; MaxLength, the maximum line size for the text of the question in any page.

Referring to FIG. 16G, each record of the QuestionType table 178 has the following data fields: QuestionTypeID, a unique identifier to each record of this table; Name, an identifier referring to the type of answer for the question, such as, radio button (select one of the following), a check box (select one or more of the following), dropdown (select one of the following), or text field (free form entry of text); and Description, text in the master language referring in more detail the identifer in the Name field. The Description field is for administrative purposes. The identifier in the Name field of the record determines the display of the responses to a question.

Referring to FIG. 16H, each record of the Campaign-Question table 179 has the following data fields: CampaignQuestionID, a unique identifier for each record in this table; the QuestionID of one of the registration question records of the Questions table 177; the CampaignID of one of the registration campaign records of the Campaign table 172; Active, a bit indicating if the question for the registration campaign associated with the CampaignID of this record is active "1" or nonactive "0"; Required, an integer which when set to "1" indicates that the question must be answered for the registration to be accepted; and FieldOrder, a value indicating the order the question with other questions for the questionnaire of the registration campaign.

Referring to FIG. 16I, each record of the LangQuestion table 180 has the following data fields: LangQuestionID, a unique identifier for each record in this table; the LangID of one of the language records on the Language table 174; the QuestionID of one of the registration question records of the Questions table 177; and Question, the text of the question in the language associated with the LangID of this record.

Referring to FIG. 16J, each record of the SubQuestion table 181 (referred to as a registration response record) has the following data fields: SubQuestionID, a unique identifier for each registration response record of this table; Name, the text of the response in the master language; the QuestionID of one of the registration question record of the Questions table 177 with the question to which related to this response; FieldOrder, the order of the response if multiple registration response records are present with the same QuestionID as this record; NewLineYes, a bit indicating whether or not the response should be on a new line of the questionnaire; and DefaultFlag, bit indicating whether or not this response should be preselected, i.e., checked or otherwise denoted as an answer on a questionnaire for purposes of assisting the registrant when the response is generally true for most registrants.

Referring to FIG. 16K, each record of the ValidationData table 182 has the following data fields: ValidationID, a unique identifier for each record of this table; the QuestionID of one of the registration question records of the Questions table 177; the SubQuestionID of one of the registration response of the SubQuestion table 181; MinValue, the minimum acceptable numeric answer to the referenced question and response of this record; MaxValue, the maximum acceptable numeric answer to the referenced question and response of this record; and DefaultFlag, a bit defining that the response should be prefilled with the value of MinValue "1" or not prefilled "0".

Referring to FIG. 16L, each record of the LangQuestion table 183 has the following data fields: LangSubQuestionID, a unique identifier for each record of this table; the LangID of one of the language records of the Language table 173; the LangQuestionID of one of the records of the LangQuestion table 180, and Name, the text of a response to a registration question in the language associated with the LangID of this record.

Referring to FIG. 16M, each record of the Campaign-Separator table 184 has the following data fields: CampSepID, a unique identifier for each record of this table; the CampaignID of one of the registration campaign records; SepID, an identifier to a record of the SeparatorType table 185 having a HTML separator tag; FieldOrder, the order of the separator tag associated with this record if multiple records are present in the CarnpaignSeparator table with the same CampaignID as this record; Title, the text to be displayed under the separator tag; and Active, a bit indicating whether or not this separator tag should be included in the registration questionnaire.

Referring to FIG. 16N, each record of the SeparatorType table 185 has the following data fields: SepID, a unique identifier for each record of this table; and Name, the HTML code for a separator tag.

Referring to FIG. 16O, each record of the Users table 186 (referred to as a user record) has the following data fields: UserID, a unique identifier for each user record in this table; E-mail, the E-mail address of a registrant associated this record; Nickname, the user name of the registrant associated with this record; Password, the password of the registrant for enabling the registrant associated with this record to modify their registration data; Cookie, the Registration Digital ID for the registrant associated with this record; Unsubscribe, a bit indicating whether or not the registrant has unsubscribed to the registration site; UnsubscribeDate, the date, if any, the registrant elected to unsubscribe; ImportFlag, a bit indicating whether or not the registration data for the registrant was imported into the table from another database. Optionally, the information in one or more of the user records may be imported from records of an external database by an import utility application of the database software of the transaction server 16 (FIG. 1) which locates the information in the external database and initially populates the records of tables of the Users table 186 with data supplied from the external database.

Referring to FIG. 16P, each record of the CampaignUser table 187 has the following data fields: CampaignUserID, a unique identifier for this record; the CampaignID of one of the registration campaign records of the Campaign table 172; the UserID of one of the user records of the Users table 186; Unsubscribe, same as the Unsubscribed bit as the user records; and UnsubscribeDate; same as the Unsubscribe-Date field in the associated user record of the Users table 186.

Referring to FIG. 16Q, each record of the Unsubscribe-Data table 188 has the following data fields: UnsubscribeID, a unique identifier for this record; the CampaignUserID of one of the records of the CampaignUser table 187; the LangQuestionID of one of the records of the LangQuestion table 180; the SubQuestionID of one of the records of the SubQuestion table 181; and WhyUnsubscribe, text with the reason why the registrant choose to unsubscribe.

Referring to FIG. 16R, each record of the Transactions table 189 has the following data fields: TransactionID, a unique identifier for this record; the UserID of one of the user records of the Users table 186; ActionID, an identifier to a record of the ActionType table 190; ActionDateTime, the date and time the transaction took place; CreateDate, the date this record was created; the CampaignID of one of the records in the Campaign table 172; IPaddress, the network address of the registrant associated with this record; BrowserType, the type of browser the registrant used to connect to the registration site; ReferringSite, the address of the site which sent the registrant to the registration site; and InitialID, an identifier to a record of the InitialAccess table 191.

Referring to FIG. 16S, each record of the ActionType table 190 has the following data fields: ActionID, a unique identifier for this record; and Name, text describing the an action, such as completing a registration questionnaire or modifying a registration questionnaire.

Referring to FIG. 16T, each record of the InitialAccess table 191 has the following data fields: InitialID, a unique identifier for this record; AccessID, an identifier to a record in the Access table 192; CreateDate, the date this record was created; ReferringDomain, the domain name of the site which sent the registrant to the registration site; IPaddress and BrowserType which are the same as their fields of the same name in the associated record of the Transaction table 189.

Referring to FIG. 16U, each record of the Access table 192 has the following data fields: AccessID, a unique identifier for this record; the CampaignID of one of the records of the Campaigns table 172; RefName, a name used to reference the registration campaign for administrative purposes; InUse, a bit indicating whether or not the registration campaign may be used to register registrants; FromWhere, the URL (network address) of the site which sent the registrant to the registration site; DefaultFlag, a bit set to "1" if the registration campaign associated with this record represents the default registration campaign of the registration site; and DefaultLangID, the LangID associated with one of the languages which is the default language for the registration campaign associated with this record.

Referring to FIG. 16V, each record of the Registration-Data table 193 has the following data fields: DataID, a unique identifier for this record; the UserID of one of the user records of the Users table; the QuestionID of one of the records of the Questions table; SubQuestionID, the Sub-QuestionID of one of the records of the SubQuestion table; Answer, text of the answered response entered by a registrant if the responses for the QuestionID has a text input fields; ModifyDate, the date this record was last modified; ImportFlag, a bit which is the same as the fields of the same name in the record of Users table when any part of the registration data is imported into this record from an external database; and the LangID associated with the language in which the answer was given. If the answered response is not a text input field, but a radio button, dropdown, or check box, the Value field may be null.

Figure 17:
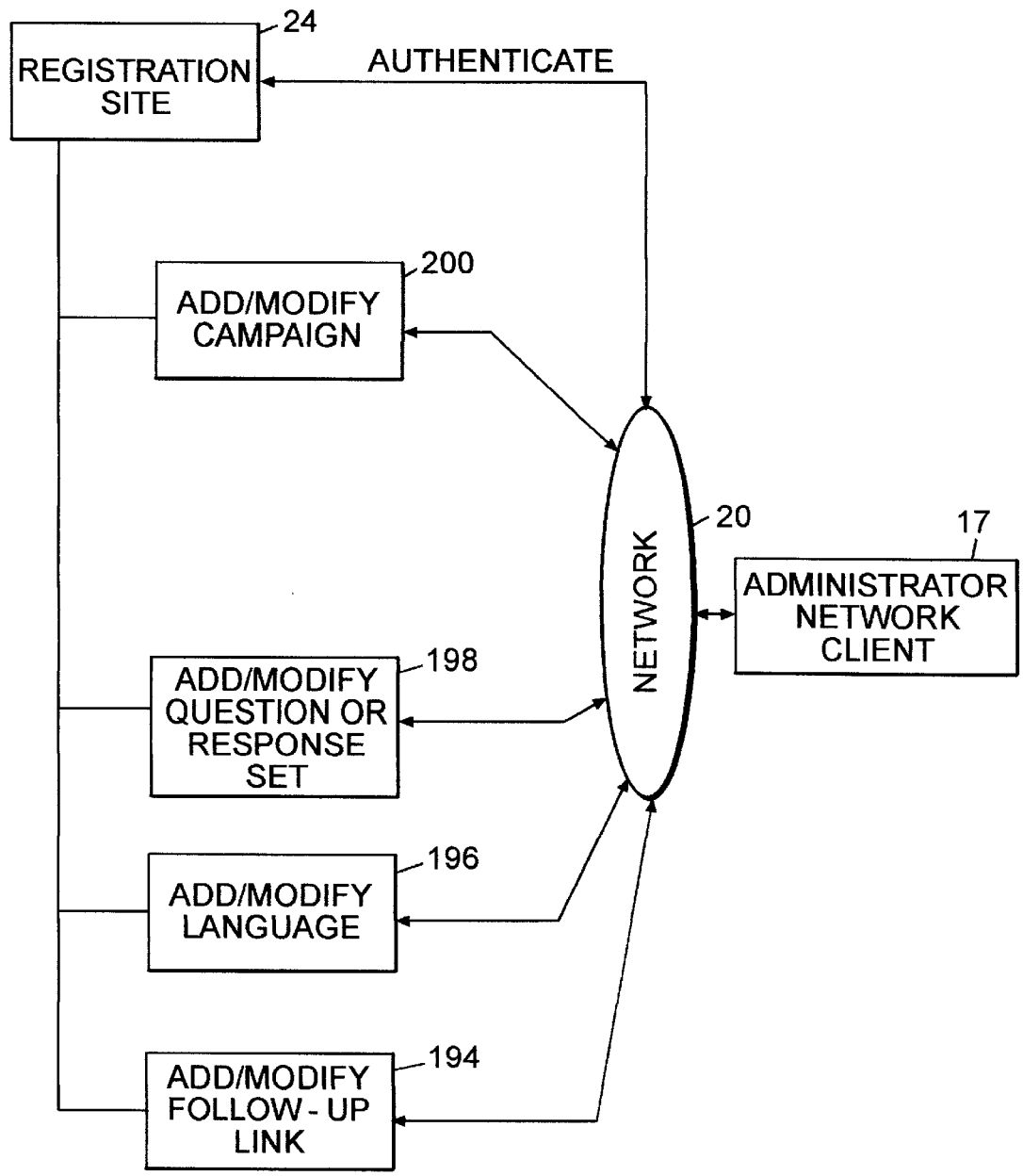
FIG. 17 is a block diagram of the administrative interface of the registration site of the system of FIG. 1.

Referring to FIG. 17, a block diagram of the administrative interface to the registration site of system 10 is shown for adding or modifying the registration information in database 15 relating to the registration campaigns, follow-up links, languages, registration questions and responses. An administrator, via their computer 17 (FIG. 1), can connect via network 20 or LAN 19 to the network server 12 at an IPaddress of the registration site assigned to the administrative interface of the registration site. The administrator's computer 17 after establishing a network connection to the administrative interface of the registration site, receives a page requesting a password to be entered, such that the administrator is authenticated by the system 10. Only authorized administrators have been assigned passwords. Like the voting site, the passwords are stored in the database 15 and can be queried by the network server 12. The passwords may be the same or different than the passwords used at the administrative interface to the voting site. If the password in valid, the administrator's computer 17 receives a page with the add/modify selections indicated by boxes 194–202.

When the Add/Modify Follow-up Link 194 is selected, a page is provided to the administrator allowing the administrator to enter an address for the registration campaign to link to after registration is complete. This address will be stored in a URL field of a SurveyLink table 175 record associated with the registration campaign. If the registration campaign has a record in the SurveyLink table, then the data is that record's URL field is shown in the page sent to the administrator, who may modify the data. The information received from the administrator's computer 17 is applied by the network server 12 to add or modify the appropriate records in the SurveyLink table 175.

The Add/Modify Languages 196 is similar to block 50 of the administrative interface to the voting site, as described earlier in connection with FIG. 6, except that the operations are with respect to Language table 173 (FIG. 16B) if the table is not the same as the Language table 31 (FIG. 3B).

Figure 18:
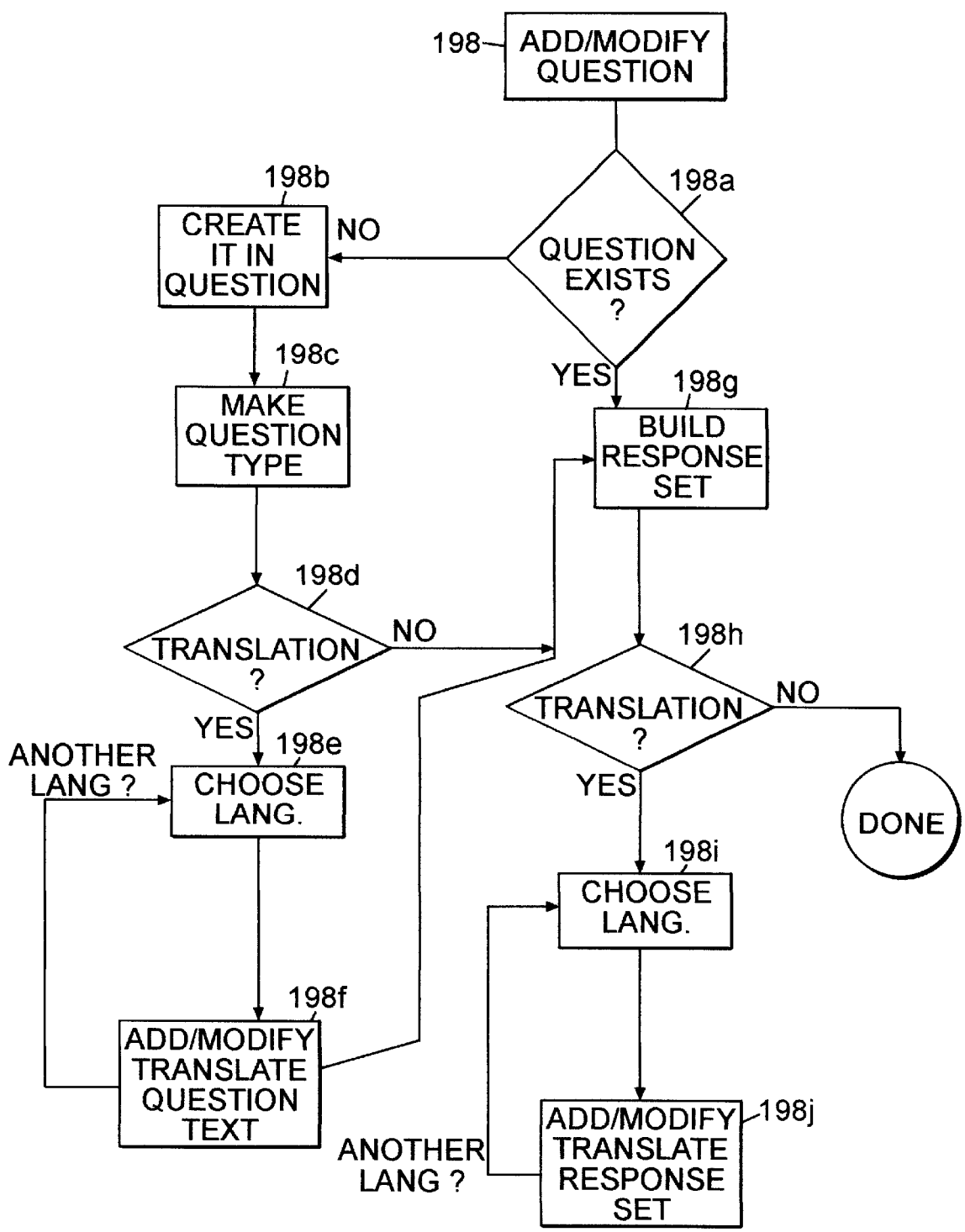
FIG. 18 is a flow chart showing the operation and programming of the Add/Modify Question block of FIG. 17.

Referring to FIG. 18, if the Add/Modify Question 198 is selected, a query page is provided at step 198a to the administrator's computer allowing the administrator to check if a registration question exists by querying the question records of the Questions table 177 (FIG. 16F). If the question does not exist, the query page may allow the user to select to create (add) a new question by receiving add question page which has prompts for the information in the data fields as described earlier for each registration question record (step 198b), and the information in the data fields as described earlier for a record in the QuestionType table 178 (FIG. 16G) to be associated with the registration question (step 198c). If the question is to be presented in multiple languages, the administrator is prompted as to whether to enter a translation (step 198d). If so, the administrator selects a language from a selection list derived from the records in the LangCampaign table 174 associated with the registration campaign (step 198e). Once a language has been selected, the administrator enters the translated question text (step 198f), which will be stored in a record of the LangQuestion table 180. Steps 198e and 198f are repeated until the question is entered in the desired languages. Next, information is prompted on the add question page for the responses to the question, which will automatically be stored in records of the SubQuestion table 181 (FIG. 16J) to be associated with the registration question (step 198g). If the response is numerical, any minimum and/or maximum range requirement will automatically be stored in a related record in the ValidationData table 182 (FIG. 16K) associated with the response. If the answer response set is to be presented in multiple languages, the administrator is prompted as to whether to enter a translation (step 198h). If so, the administrator selects a language from a selection list derived from the records in the LangCampaign table 174 associated with the registration campaign (step 198i). Once a language has been selected, the administrator enters, for each response to the question, the translated response's text (step 198j), which will be stored for each response in record of the LangSubQuestion table 183. Steps 198i and 198j are repeated until the set of the responses for the question are entered in the desire languages. If the question exists in the Questions table 177 at step 198a, a review or modify page is sent from the network server 12 to the administrator's computer 17 having prompts with field having the information (question text) existing in the question record and any related records (translated question text) in the LangQuestion table 180, with information (responses' text) existing in the records of the SubQuestion table 181, and their related records (translated responses' text) in the LangSubQuestion table 183. The information received from the administrator's computer 17 is applied by the network server 12 to add or modify the appropriate records in the Questions table 177, SubQuestion table 181, ValidationData table 182, LangQuestion table 180 and LangSubQuestion table 183.

Figure 19:
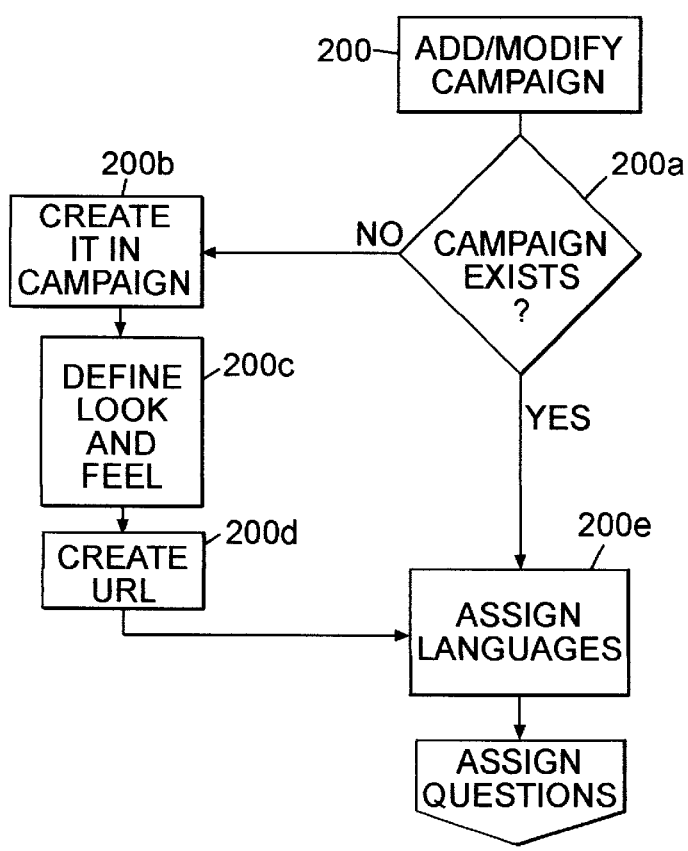
FIGS. 19 and 20 are connected flow charts showing the operation and programming of the Add/Modify Campaign block of FIG. 17.

Referring to FIG. 19, if the Add/Modify Campaign 200 is selected, a query page is provided at step 200a to the administrator's computer 17 allowing the administrator to check if a registration campaign exists by querying the registration campaign records of the Campaign table 172 (FIG. 16A). If the registration campaign does not exist, the query page may allow the user to select to create (add) a new campaign by receiving an add registration campaign page which has prompts for the information in the data fields as described earlier for a registration campaign record (step 200b), and information defining the display characteristics providing a desired look and feel for the registration campaign are provided by the administrator by storing (or downloading) to the network server 12 at a location in the database 15 (step 200c). In the add registration campaign page, the network server 12 automatically creates a unique URL for the new registration campaign, such that a registration campaign can be accessed by a registrant requesting a connection to the network server 12 at this URL (step 200d). The URL is stored in the URL data field of the new record of the SurveyLink table 175. If the registration campaign exists, a review or modify page having prompts with field having the information existing in the campaign record is sent to the administrator's computer 17. The information received from the administrator's computer is applied by the network server 12 to the Campaign table 172, via the transaction server, to either add a new registration campaign record or modify an existing registration campaign record, and any associated records in the SurveyLink and LangSurvey tables 175–176. After adding or modifying a registration campaign record, a page is sent to the administrator's computer at step 200e listing any records in the LangCampaign table 174 (FIG. 16C) for all languages (LangID), if any, assigned to the registration campaign and allows the administrator to add or modify assignments of the languages to the registration campaign. In response to receiving any add or modify assignments of languages to registration campaign, the received information is applied by network server 12, via the transaction server, to the records of the LangCampaign table. The network server 12 branches to FIG. 20 to assign registration questions to the registration campaign.

Figure 20:
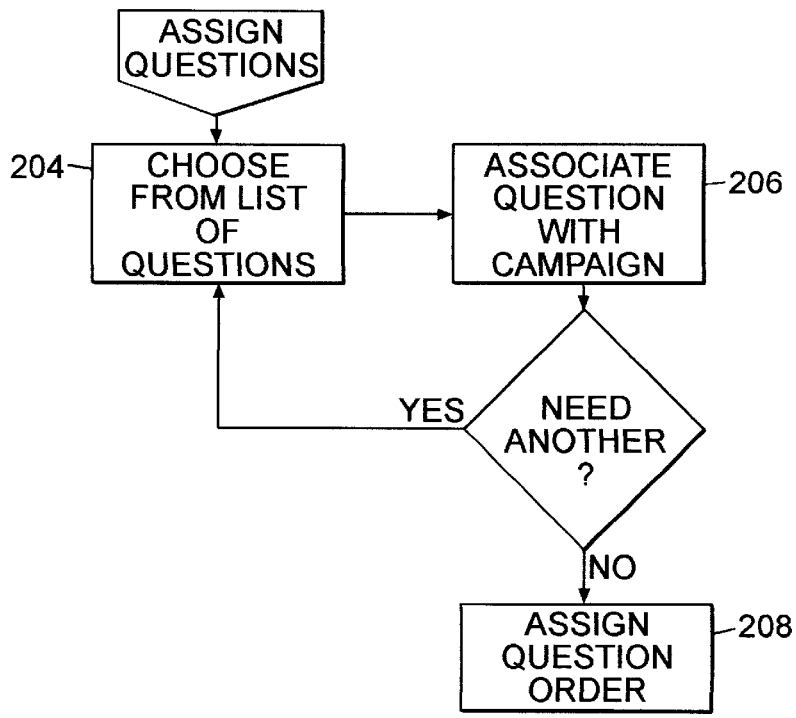
Figure 21:
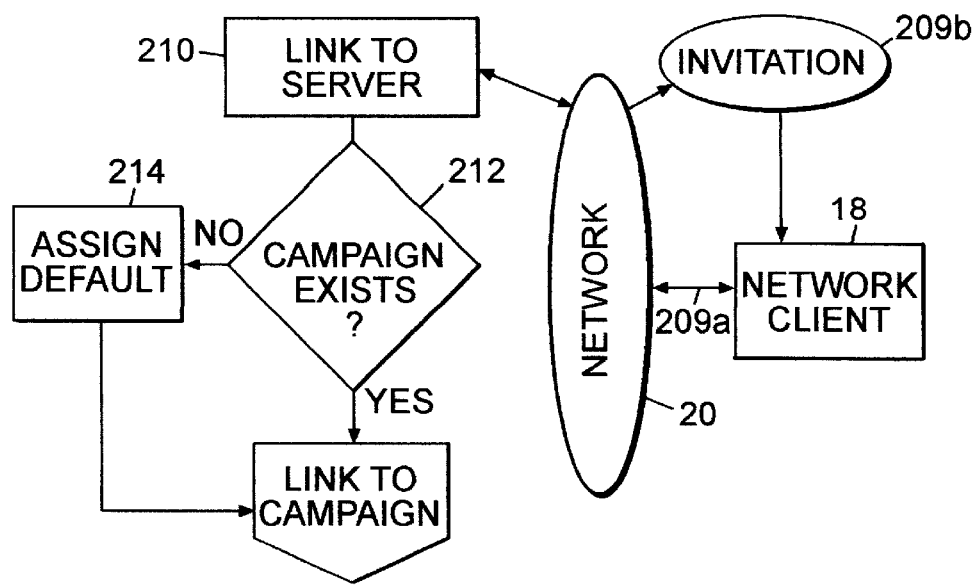
FIGS. 21, 22, 23, 24, and 25 are connected flow charts showing the operation and programming of the registration site of the system of FIG. 1 during a network transaction with the computer of a voter or registrant, which enables registration with the system for each of the registration campaigns.
Figure 22:
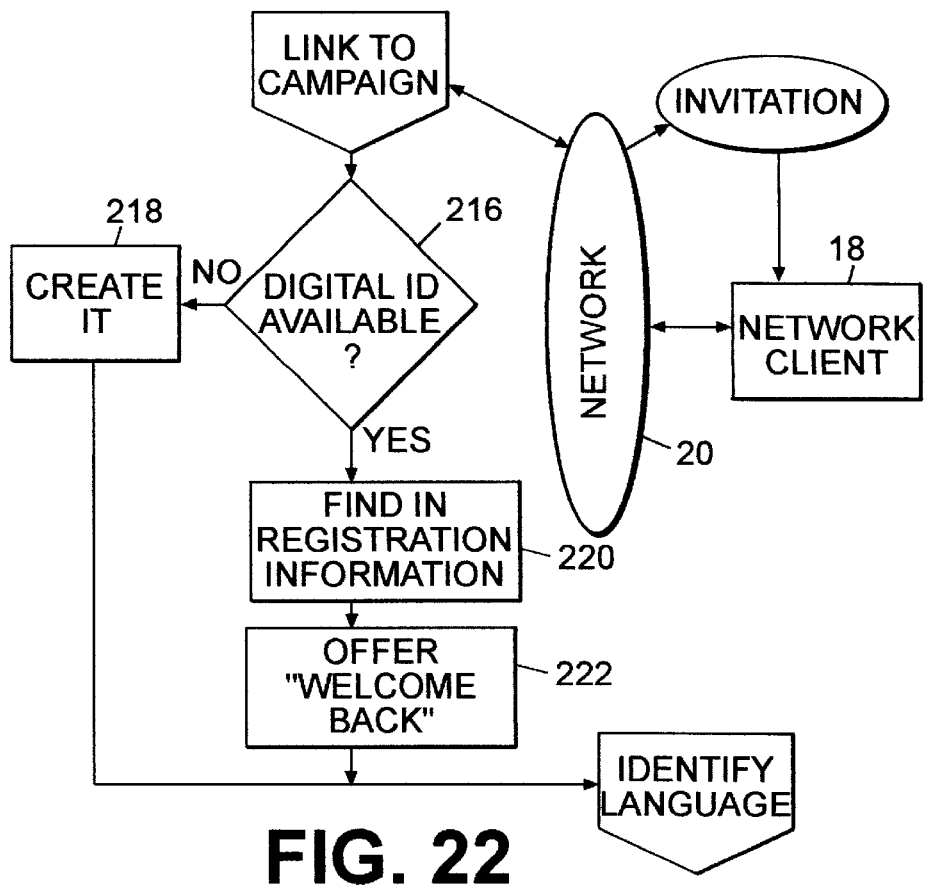

In FIG. 20, a page is sent to the administrator having list of all the registration questions, and their linked responses, in the master language from the Questions table 177 and the SubQuestion table 181. The list may include a notation to each registration questions indicating if the question is already linked to the registration campaign by querying the records of the CampaignQuestion table 179 for associated with the registration campaign's CampaignID. The administrator selects one or more of the registration questions and submits the selection to the network server 12 (step 204). In response, the network server 12 associates the registration questions with the registration campaign by creating a record for each question in the CampaignQuestion table 179 with the CampaignID of the registration campaign and the QuestionID of the question selected (step 206). Steps 204 and 206 are repeated until the desired registration questions are selected for the registration questionnaire. Next, a page with the selected questions is sent to the administrator with prompts to select the order of the selected questions (step 208). The desired order is added to the FieldOrder field of the CampaignQuestion table record for each of the selected questions with an indication in the Required field if an answer to the question is required. Data for the FieldOrder and Required fields may be prompted to the administrator when each question is selected.

Referring to FIGS. 21–25, a flow chart of the operation and programming of the network server 12 for the registration site when connected to one of the registrant's computer 18, i.e., a network client computer, is shown. Similar to the voting site, the computer 18 links to the network server 12 by either a direct connection, indicated by bidirectional arrow 209a, or through an invitation 209b (step 210) at a URL having the query string with the AccessID or CampaignID of a registration campaign. Once a network client computer 18 has established a session, the network server 12 checks if the registration campaign exists by querying the registration campaign records of the Campaign table 172 of database 15, via the transaction server, to match the URL used by the network client with any of the URL fields of the SurveyLink and registration campaign records (step 212). If so, and if the Active field of the campaign record located is set to active and has a BeginDate equal to or earlier than the current date maintained at the network server, the network server 12 branches to FIG. 22, otherwise, a default registration campaign is assigned (step 214) before branching to FIG. 11. To determine which registration campaign is the default registraion campaign, the records of the Access table 192 are queried for any registration campaign's CampaignID having a set DefaultFlag. There is only one registration campaign having a set DefaultFlag in its Access table record. The default registration campaign is used to allow a registrant to register for a general, topical registration campaign defined in database 15. Thus, a registration campaign record for the registration campaign has been established for the registrant which defines this registration session's CampaignID.

Next, the network server 12 checks if a Registration Digital ID is available by requesting the browser of the network client computer 18 for any cookies having data indicating that they were sent to the browser by the registration site, or the voting site, of the network server 12 in a previous session with the network server (step 216). If no Registration Digital ID is available, the network server creates the Registration Digital ID identifying the registration site of the network server 12 and the registration session's CampaignID, and stores the Registration Digital ID at the browser of the network client computer, if possible. If a Registration Digital ID was available at step 216, the network server 12 queries the Cookie field in the records of the Users table 186 to obtain the UserID of the registrant (step 220). At step 222, a page may be sent to the registrant welcoming back the registrant. The network server 12 then branches to step 224 of FIG. 23 to identify the preferred language of the registrant.

Figure 23:
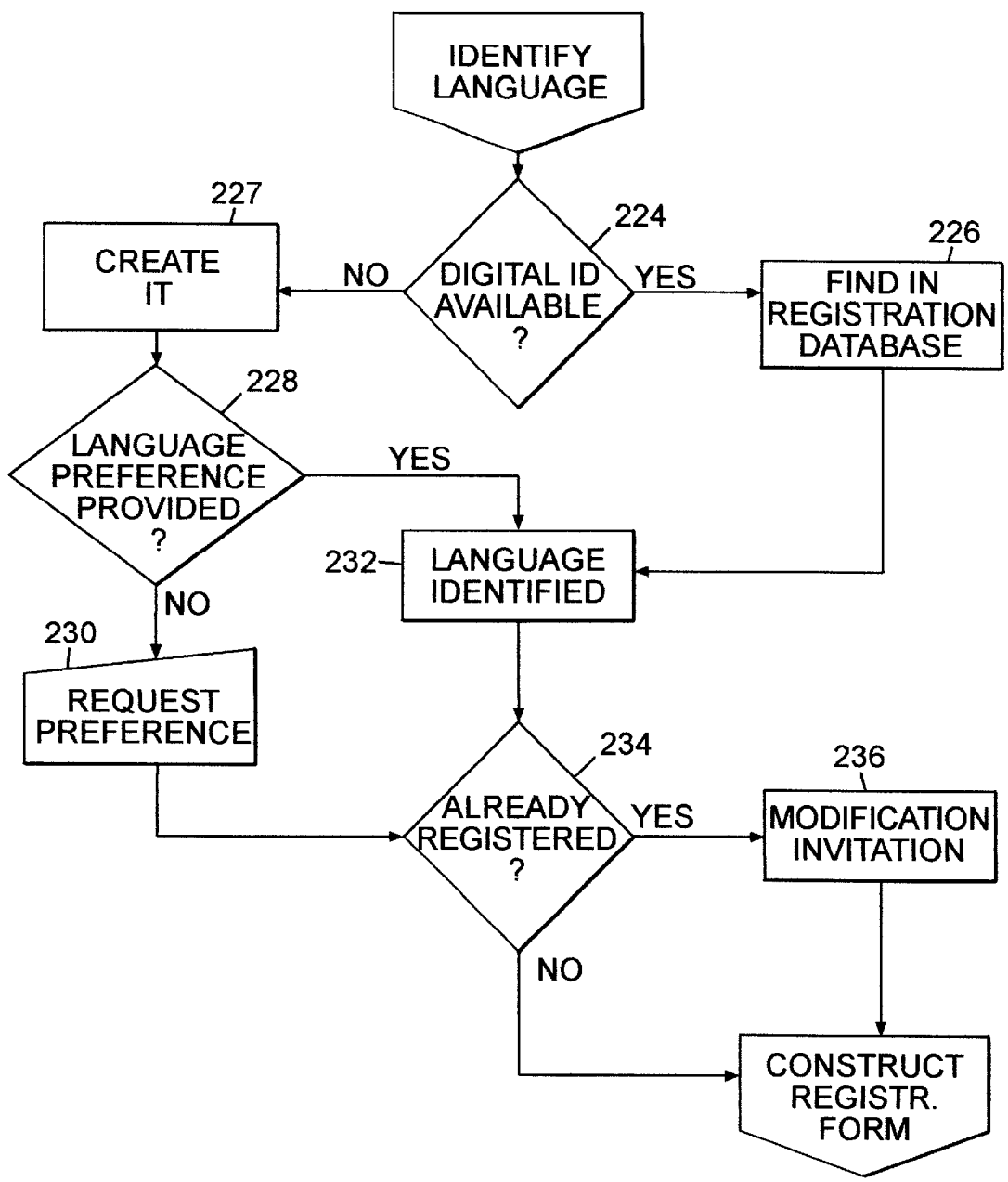

Referring to FIG. 23, if a Registration Digital ID was available at step 216, the network server 12 queries the records of the RegistrationData table 193 for any records having the UserID determined at step 220 (steps 224 and 230). Based on the LangID field of one or more or the records located in the RegistrationData table 193, the preferred Language of the registrant is identified (step 232). If no Registration Digital ID was available at step 216, the network server 12 creates one and checks (requests) the browser of the network client computer 18 if any language preference is stored in its browser (step 228). As stated earlier, certain types of browser software may have a setting for a language preference which can be obtained by a request from a network server. If preferred language is provided by the browser of the network client computer 18, the record corresponding to the language is obtained from the Languages table 173 to identify the LangID associated with the language (step 232). If the browser uses predefined codes to represent different language, an additional language lookup table stored in database 15 may be used by the network server 12 to identify the LangID of the language returned from the browser. If no preferred language is provided by the browser of the network client computer 18, the network server 12 prepares a page based on the language records of the Languages table 173 (or Languages table 31 of FIG. 3B if a common language table is used by both the registration and voting sites) having LangIDs associated with records in the LangCampaign table 174 for the registration campaign session's CampaignID with the stored names of each language and the language graphic enabling the registrant to select one of the languages as the preferred language (step 230). The returned selected language represents the preferred language of the registrant. The preferred language will be stored in the records of the RegistrationData table 193 under the LangID field. From either step 230 or step 232, the network server 12 checks whether the registrant has already registered in the registration campaign (step 234) by checking the records of the InitialAccess table 191 for any record having the registrant's UserID indicating completion of a registration questionnaire. If such a record of the InitialAccess table 191 is located, the registrant is sent a modification invitation page which prompts the registrant to select if they which to revise their answers to a previous registration questionnaire for the registration campaign (step 236) and to answer any questions which are new to this registration campaign since the registrant last registered. If modification is not selected, the registrant is links (connected) back to the referring site on the network. The address of the referring network site was stored in a record of the Access table 192 (FIG. 16U). If the registrant has already registered or has not registered, the network server 12 branches to step 238 of FIG. 24 to construct a registration questionnaire form which allows the registrant who previously registered to edit their answers and answer any new registration questions, and the registrant who has not yet registered to answer the questionnaire.

Figure 24:
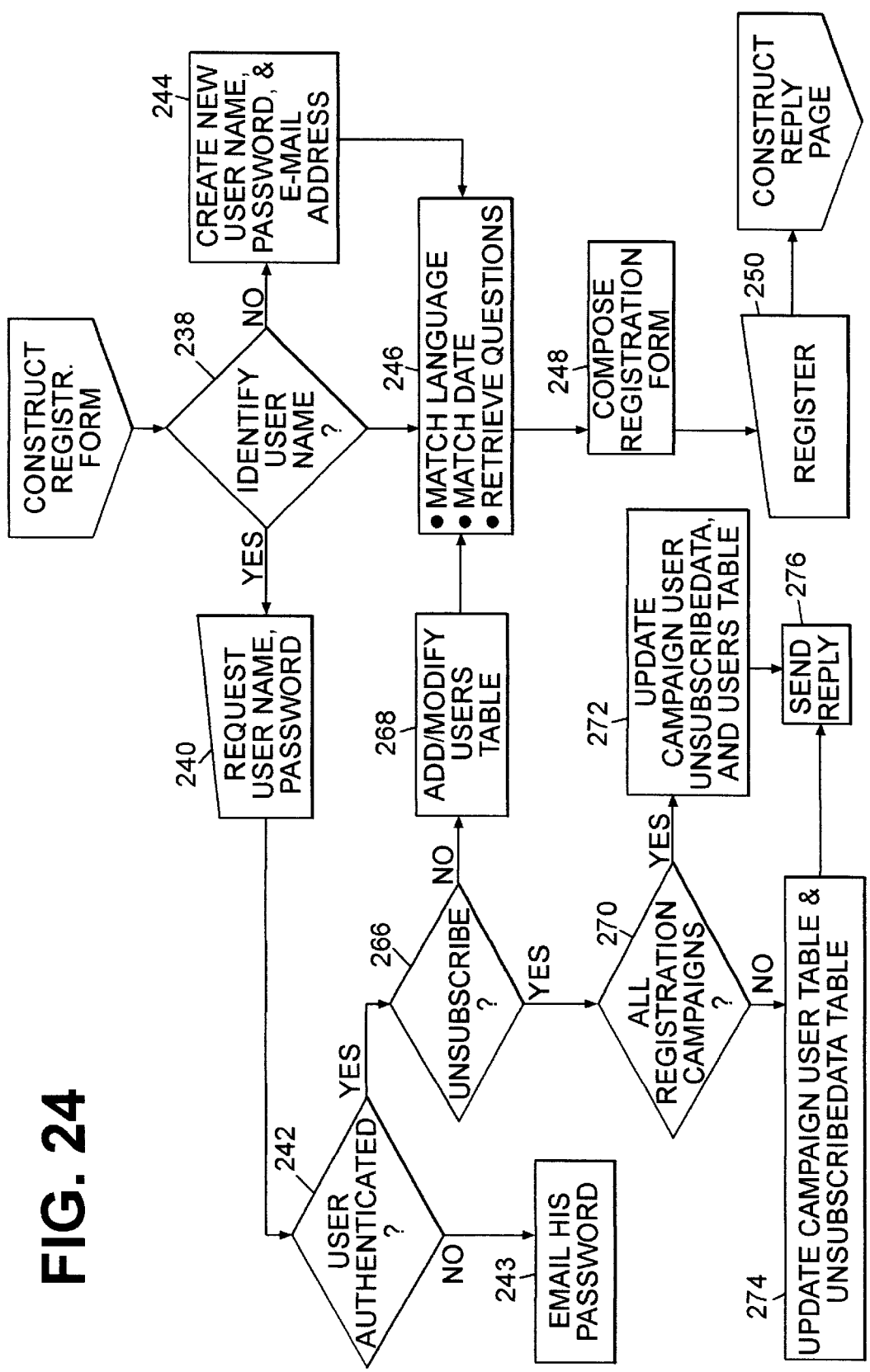

Referring to FIG. 24, the network server 12 queries the records of the Users table 186 having the registrant's UserID. Every registrant has a record in the Users table, since it is created the first time each registrant connects to the registration site of network server. If the record retrieved has data in the nickname field and the password field, the network server sends a page to the registrant requesting the registrant to enter their user name and password (step 240). The registrant is authenticated if the user name and password entered matches the retrieved nickname and password (step 242), otherwise, the registrant, at their request, maybe E-mailed their password at the address stored in the E-mail field (step 243) and receives a page with an error message indicating the password or user name is incorrect. If the record retrieved lacks data in the nickname and password fields at step 238, then the network server 12 sends a page to the registrant requesting the registrant to create a user name and password (step 244). The returned user name and password are stored the record of the UserID table having the registrant's UserID in the nickname and password fields, respectively.

The page sent to the registrant at step 242, may further have a button prompting the user if they wish to unsubscribe to this registration campaign or all registration campaign. If the registrant is authenticated at step 242, the registrant requests to be unsubscribed to all campaigns (steps 266 and 270), the registrant receives a page requesting their reason for unsubscribing and then at step 277, the Users table 186, CampaignUser table 187, and UnSubscribedata table 188 are updated (step 272). If the subscriber wishes to unsubscribe to only this session's registration campaign, then the CampaignUser table 187 and UnSubscribedata table 188 are updated (step 274). The question and response requesting the reason for unsubscribing is located in the records of the LangQuestions and SubQuestions table in accordance with the UnsubscribeData table 188. After steps 272 or 274, the registrant receives a confirming reply page and may then be linked to the referrer. The address of the referring network site was stored in a record of the Access table 192 (FIG. 16U). To update the CampaignUser table 187, the Unsubscribe bit is set and the UnsubscribeDate are added to the record in the CampaignUser table for the registrant's UserID and registration session's CampaignID. To update the UnsubscribeData table 188, a new record is added to this table with information having the reason why the registrant unsubscribe in the WhyUnsubscribe field and data in related fields. To update the registrant's record in the Users table 186, the Unsubscribe bit is set and the UnsubscribeDate are added. The registration site uses the Unsubscribe and CampaignUser tables for administrative purposes, such tables are not required for building questionnaires and recording registration data from answered questionnaires.

A registration form is then dynamically constructed from the records of the database 15 similar to steps 100–116 shown in FIG. 13A for building a survey at the voting site. First, a base HTML page is constructed corresponding to the registration campaign for the language of the registrant. The layout of the page is located in memory of the network server 12 or database 15 from the DirectoryName of the registration campaign record in Campaign table 172 with any background, logos, hyperlinks, or other display characteristic for each page of the registration campaign, such as the color of the text. Based on the registration campaign's CampaignID, the registration questions are selected (retrieved) from the CampaignQuestion table 179 (FIG. 16H). Also, the record in the SurveyLink table is located for the registration campaign. In step 246, the registrant's preferred language LangID of RegistrationData table 193 is used to identify that the registration questionnaire page is to be offered in the registrant's language. A match is made between the SurveyID and the LangID of the LangSurvey table 176. If a match is not found, the registration questionnaire is built from the default language as specified in the DefaultLangID field of Access table 192. Of the registration question records located, the order of the questions is identified by the FieldOrder field in the records and then sorted by the defined order. The text of each of the questions in the registrant's preferred language LangID is located in the records of the LangQuestion table 180 (FIG. 16I) by the QuestionID associated with each of the registration questions. For each registration question, the registration response records in the SubQuestion table 181 are located by the QuestionID of the question, and then the text of the answer in the registrant's preferred language LangID is located in the records of the LangSubQuestion table 183 (FIG. 16L) by the LangQuestionID associated with each registration question having the same LangID. Thus, each registration question and the set of responses in the preferred language of the registrant are obtained. The set of responses are sorted for each registration question by the number in FieldOrder associated with each response. Each registration question is then constructed by providing the text of the question and the sorted set of responses for the question in the registrant's preferred language. The template for the responses to the question is determined in accordance with each registration question's associated record in the QuestionType table 178 (FIG. 16G). The separator tags defined by the records in the CampaignSeparator table 184 and SeparatorType (FIGS. 16M–16N) are used in the registration form page between registration questions.

Next, the records of the RegistrationData table 193 (FIG. 16V) are queried for records associated with the registrant's UserID for the registration questions (QuestionID) and responses (SubQuestionID) to the registration questions of the questionnaire. If records are located in the RegistrationData table 193, the answer fields of such records are used in the response template associated with each registration question. If no records are located in the RegistrationData table 193 for the registrant's UserID for the registration questions, then the response template is used to identify for each response a desired input field, which may be a box onto which a registrant clicks, or a field into which a text or numerical answer may be inserted. If the DefaultFlag is set in the record of the SubQuestion table for any response, the input box or button associated with the response is preselected. Also, if the response has a related record in the ValidationData table 182 with a DefaultFlag set to "1", the value MinValue field of that record is pre-entered in the input field for the response. The registration questions in their sorted order are coded in HTML and inserted in the base HTML page constructed earlier. The text (and graphics and hyperlink buttons) of the registration instructions in the registrant's preferred language are assembled from the HTML page pointed to by the Campaign field in the LangCampaign table 174 having the registration session's CampaignID and registrant's preferred language LangID.

Similar to the survey form page, the registration questionnaire form page provides for a selection of one of the languages from the records of the Languages table 31 (FIG. 3B) or 173 (FIG. 16B). If a language is selected, the registration questionnaire form page will be reconstructed in the selected language and sent to the registrant. The resulting registration questionnaire form is then sent to the network client computer 18 to enable the registrant to register for the registration campaign, or edit previous answers to the registration questions (step 250) if response data was added to the questionnaire page from records of the RegistrationData table for the registrant's previous registration. The registrant answers the registration questionnaire by clicking on selected answers or inputting text under each question as appropriate for the question type. The page has a submit button which enables the registrant to send the answers to the registration questions to the network server 12. The network server then branches to step 252 of FIG. 25 upon receiving the answers to the questionnaire.

Figure 25:
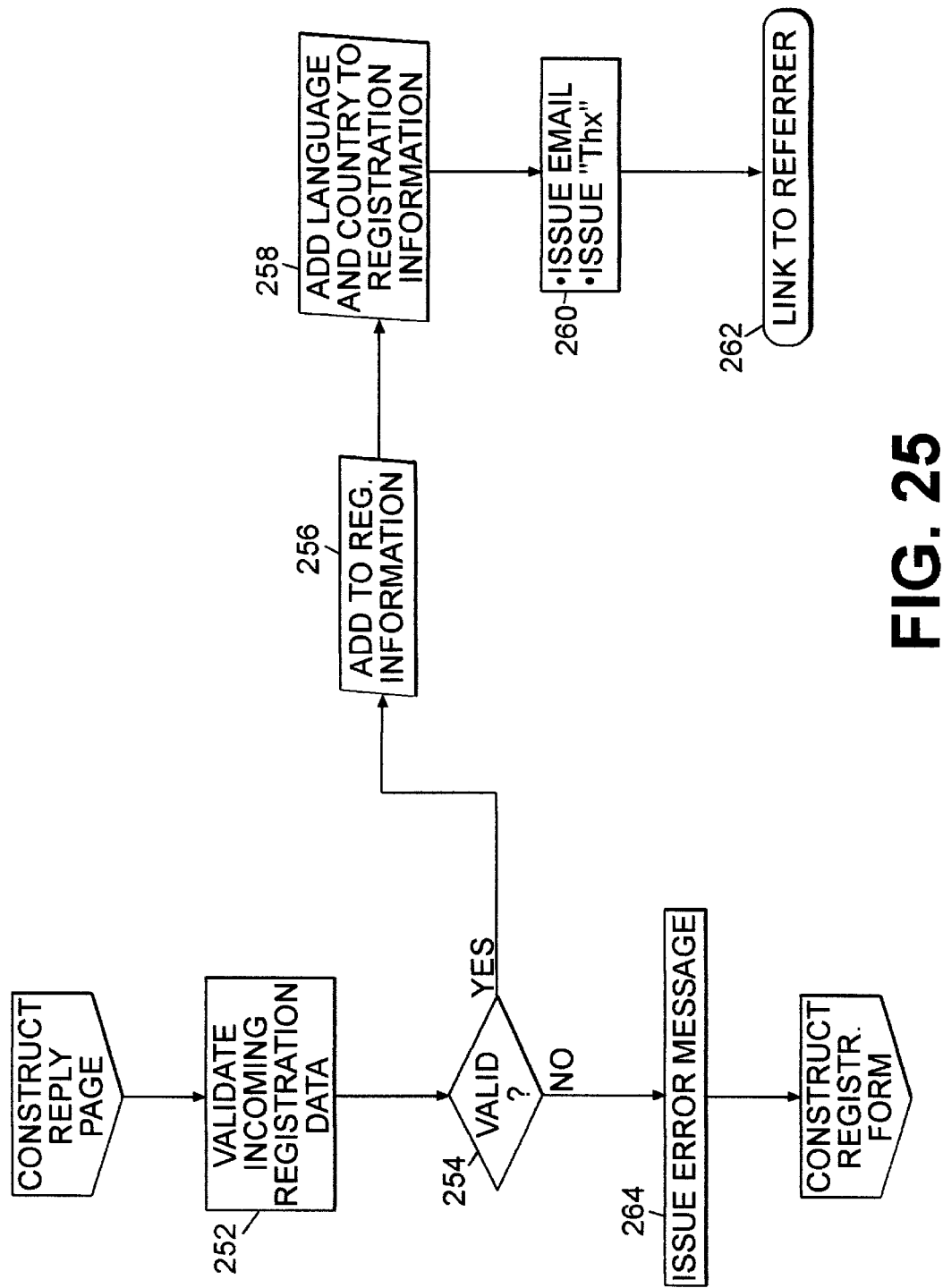

Referring to FIG. 25, the network server 12 validates the answers of the incoming registration data by checking that each question having an associated QuestionType table record with a set Required field is answered, and that numerical answers are in the minimum and maximum values of any associated records in the ValidationData table. If any of the answers are not valid at step 254, the network server 12 send a page with an error message to the registrant (step 264) and branches back to step 238 of FIG. 24 to reconstruct the registration question form. If the answers are valid at step 254, and if this is a first time registration of the registrant for the registration campaign, each answered response is added to a new record of the RegistrationData table with the registrant's UserID, the QuestionID of the registration question, the SubQuestionID of the response, and the LangID of the preferred language of the registrant (step 256). If the answers are valid at step 254, and if this a modification of any responses to existing records (or new responses for any new registration questions) in the RegistrationData table, the Answer field of such records associated with any modified response are updated by the network server 12 via the transaction server 16. After step 256, the language of the registrant selected in the questionnaire is added to the LangID and Answer fields of the record in the RegistrationData table 193 (step 258), an E-mail message is prepared and sent to the registrant's E-mail address with a confirmation of the registration, and the user may be sent the a page from the template at the ThankYouURL address of the registration campaign in the registrant's language with a thank you for registering message (step 260). The registrant is then linked (connected) back to the referring network site which sent the registrant to the registration site (step 262). Optionally, the template of the ThankYouURL may include a link defined by the URL field of the SurveyLink table record associated with the registration campaign, which will link the registrant's computer to another site, such as provided by the voting site. For example, this site may permit the registrant to be a voter for a survey. The address of the referring network site was stored in a record of the Access table 192 (FIG. 16U).

The data structures of the tables of the database 15 described above are exemplary. Other data structures may be used with different tables for storing the voting and registration information described herein. The labels PK in the tables indicate a data field representing a primary key of the table, and FK represent non-primary key of the table. The type of data listed is listed after each data field in the tables, such as "int" for integer, and "varchar(maximum number of characters)", are used for purposes of illustration. Data in several of the records of the tables of FIGS. 3 and 16 may be added by the network server 12 to the database 15 during a transaction with a registrant or voter at the voting and registration sites, respectively, from information received from the browser of the connected network client, for example, BrowserType, IPAddress, Referring Site, FromWhere, Referring Domain, or other similar information, as typical of network servers providing a site on the Internet. Further, the system of present invention may be applied to other types of surveys in different languages in which different types of categories other than countries are used, such as different categories of sports.

From the foregoing description, it will be apparent that an improved system for conducting surveys to voters in multiple different languages and registering of voters or other registrants has been provided. Variations and modifications of the herein described system and other applications for the invention will undoubtedly suggest themselves to those skilled in the art. Accordingly, the foregoing description should be taken as illustrative and not in a limiting sense.

What is claimed is:

1. A system for conducting surveys to voters over a network in a plurality of different languages and in a plurality of countries in which each of said voters has a computer system capable of communicating with said system, said system comprising:

at least one network server providing at least one site on the network, said network server being connectable over said network with the computer system of each of said voters by addressing said site, in which said computer system of each of said voters when connected to the network server represents a network client to said network server;

a database, coupled to said network server, storing information for building surveys of questions in a plurality of languages; and said network server comprises:

means for determining which one of said plurality of languages represents the language of the voter of each said network client;

means for building a survey of one or more questions in the language of the voter of each said network client in accordance with said information stored in said database;

means for sending said survey over the network to voter of each said network client;

means for receiving answers to said questions of said survey from the voter of each network client; and means for determining one of a plurality of different countries as the country of the voter of each network client, wherein said information further comprises tally data for the survey in each of the countries, and said network server further comprises:

means for updating said tally data for the country of the voter of each network client in accordance with the received answers to the survey from the voter;

means for building a summary of the results of the survey in accordance with said updated tally data for the country of the voter; and means for sending said summary over the network to voter of each said network client.

2. The system according to claim 1 wherein said summary represents a first summary, and said network server further comprises:

means for enabling the voter to select another one of said counties other than the country of the voter, in which said summary building means builds a second summary of the results of the survey in accordance with said tally data for the selected country, and said sending means sends said first and second summary over the network to the voter.

3. The system according to claim 1 wherein said information stored in said database defines a plurality of campaigns having ones of said survey, and said network server further comprises:

means for enabling said voter of each network client to select one of said campaigns when addressing said site of the network server in which said survey provided by said building means represents one of said surveys of said selected campaign.

4. The system according to claim 1 wherein said database represents records of a plurality of tables storing information representing at least the questions in a plurality of languages, responses to said questions in a plurality of languages, and surveys defining by one or more of said questions.

5. The system according to claim 1 wherein said information stored in said database further comprises the answers to each survey received from each voter, and said network server further comprises means for adding the received answers to the information stored in the database.

6. The system according to claim 1 wherein said information stored in said database further comprises the responses to each of said questions in a plurality of languages, and said building means provides after each said question of the survey the responses associated with the question in accordance with the information stored in the database, and said answers received by said receiving means represent the responses selected by the voter to each of the questions of the survey.

7. The system according to claim 6 wherein said network server further comprises means for determining one of a plurality of different countries as the country of the voter of each network client.

8. A system for conducting surveys to voters over a network in a plurality of different languages and in a plurality of countries in which each of said voters has a computer system capable of communicating with said system, said system comprising:

at least one network server providing at least one site on the network, said network server being connectable over said network with the computer system of each of said voters by addressing said site, in which said computer system of each of said voters when connected to the network server represents a network client to said network server;

a database, coupled to said network server, storing information for building surveys of questions in a plurality of languages; and said network server comprises:

means for determining which one of said plurality of languages represents the language of the voter of each said network client;

means for building a survey of one or more questions in the language of the voter of each said network client in accordance with said information stored in said database;

means for sending said survey over the network to voter of each said network client;

means for receiving answers to said questions of said survey from the voter of each network client; and means for determining one of a plurality of different countries as the country of the voter of each network client, wherein said information stored in said database further comprises the responses to each of said questions in a plurality of languages, said building means provides after each said question of the survey the responses associated with the question in accordance with the information stored in the database, said answers received by said receiving means represent the responses selected by the voter to each of the questions of the survey, and said information stored in the database further comprises for each of the countries and for each response to the questions of the survey a first tally of the number of time the response was selected by voters of the country.

9. The system according to claim 8 wherein said network server further comprises means for indexing the first tally associated with the country of the voter for the responses selected by the voter to the questions of the survey.

10. The system according to claim 9 wherein said information stored in said database further comprises for each of the countries and for each question of the survey a second tally of the number of times the question was answered by voters of the country.

11. The system according to claim 10 wherein said network server further comprises means for indexing the second tally associated with the country of the voter for each of the questions answered by the voter.

12. The system according to claim 11 wherein said network server further comprises:

means for building a summary of the results of the survey in the language of the voter of each said network client in accordance with the first tally associated with the country of the voter for each of the responses to the questions of the survey, and the second tally associated with the country of the voter for each of the questions of the survey; and means for sending said summary over the network to the voter of each said network client from which answers to the survey were received.

13. The system according to claim 12 wherein said network server further comprises:

means for enabling the voter of each network client to select another one of said countries other than the country of the voter;

means for building a summary of the results of the survey in the language of the voter of each said network client in accordance with the first tally associated with said selected country for each of the responses to the questions of the survey, and the second tally associated with said selected country for each of the questions of the survey; and means for sending said summary over the network to the voter of each said network client.

14. A system for conducting surveys to voters over a network in a plurality of different languages and in a plurality of countries in which each of said voters has a computer system capable of communicating with said system, said system comprising:

at least one network server providing at least one site on the network, said network server being connectable over said network with the computer system of each of said voters by addressing said site, in which said computer system of each of said voters when connected to the network server represents a network client to said network server;

a database, coupled to said network server, storing information for building surveys of questions in a plurality of languages; and said network server comprises:

means for determining which one of said plurality of languages represents the language of the voter of each said network client;

means for building a survey of one or more questions in the language of the voter of each said network client in accordance with said information stored in said database;

means for sending said survey over the network to voter of each said network client; and means for receiving answers to said questions of said survey from the voter of each network client, wherein said information stored in said database further comprises the responses to each of said questions in a plurality of languages, said building means provides after each said question of the survey the responses associated with the question in accordance with the information stored in the database, said answers received by said receiving means represent the responses selected by the voter to each of the questions of the survey, said information stored in said database further comprises a first tally of the number of times each of the responses of the survey is selected by voters, and a second tally of the number of times each of the questions of the survey was answered by the voters, and said network server further comprises:

means for indexing said first tally associated with each selected response received from the voter to each question of the survey, and indexing said second tally associated with each question of the survey answered by the voter;

means for building a summary of the results of the survey in the preferred language of the voter in accordance with the questions and responses to the questions stored in the database, the first tally associated with each selected response to each question of the survey, and the second tally associated with each question of the survey; and means for sending said summary over the network to the voter of each said network client from which responses to the survey were received.

15. The system according to claim 1 wherein said network server further comprises means for determining when the voter has received and voted in the survey produced by said building means to prevent said building means and sending means from providing another survey to the voter.

16. The system according to claim 1 further comprising a transaction server coupled to said database capable of accessing and updating said database responsive to said network server.

17. The system according to claim 1 in which said survey is sent to the voter of each network client in a page having predefined display characteristics.

18. The system according to claim 1 wherein said network represents the Internet.

19. The system according to claim 1 wherein said site represents a voting site and said information represent voting information related to said voting site, and database further stores registration information for building questionnaires having questions in a plurality of different languages and recording the results of the questionnaire, said network server further provides a registration site addressable by the computer system of a voter, said network server further comprises:

means for building a registration questionnaire of one or more questions in the language for the voter of each said network client in accordance with said registration information stored in said database;

means for sending said registration questionnaire over the network to the voter of each said network client; and means for receiving answers to said registration questionnaire from the voter of each network client, and adding the answers to the registration information of the database.

20. The system according to claim 1 wherein said network server further comprises means for generating at least one digital ID for each voter of a survey, storing said generated digital ID in said database, and sending said digital ID to the network client for storage at the network client to enable the network server to detect one of said voters who reconnects to the site of the network server.

21. The method according to claim 19 wherein said network server further comprises means for enabling the voter to revise their answers stored in the registration information of the database.

22. The system according to claim 1 wherein said network server provides another site for enabling registration of the voters of each network client, and further comprises means for registering the voters of each network client with the system in the language of the voter.

23. A method for conducting surveys to voters over a network in a plurality of different languages and in a plurality of countries at least one site on the network provided by a network server in which each of said voters has a computer system capable of communicating with said network server, said method comprises the steps of:
    connecting said network server over said network with the computer system of one or more of said voters by addressing said site, in which said computer of each voter when connected to the network server represents a network client to said network server;
    providing a database, coupled to said network server, which stores information for building surveys of questions in a plurality of languages;
    determining which one of said plurality of languages represents the language of the voter of each said network client;
    building a survey of one or more questions in the language for the voter of each said network client in accordance with said information stored in said database;
    sending said survey over the network to voter of each said network client;
    receiving answers to said questions of said survey from the voter of each network client;
    determining one of a plurality of different countries as the country of the voter of each network client;
    determining the results of the survey for the country of the voter;
    building a summary of the results; and
    sending said summary over the network to voter of each said network client.

24. The method according to claim 23 wherein said summary represents a first summary, and said method further comprises the step of:
    selecting another one of said counties other than the country of the voter, in which said summary building step builds a second summary of the results of the survey for the selected country, and said sending means sends said first and second summary over the network to the voter.

25. The method according to claim 23 wherein said site represents a voting site and said information represent voting information related to said voting site, said database further stores registration information for building questionnaires having questions in a plurality of different languages and recording the results of the questionnaire, said network server further provides a registration site addressable by the computer system of a voter, and said method further comprises the step of:
    building a registration questionnaire of one or more questions in the preferred language for the voter of each said network client in accordance with said registration information stored in said database;
    sending said registration questionnaire over the network to the voter of each said network client;
    receiving answers to said registration questionnaire from the voter of each network client; and
    adding the answers to the registration information of the database.

26. The method according to claim 25 further comprising the step of revising the registration information of the database in accordance with the voter modifying their answers to said registration questionnaire.

27. A system for registering users over a network in a plurality of different languages in which each of said users has a computer system capable of communicating with said system, said system comprising:
    at least one network server providing at least one site on the network, said network server being connectable over said network with the computer system of each of the users by addressing said site, in which said computer of each of the users when connected to the network server represents a network client to said network server;
    a database, coupled to said network server, storing information for building questionnaires having questions in a plurality of different languages and recording the results of the questionnaire; and
    said network server comprises:
        means for building a registration questionnaire of one or more questions in the language for the user of each said network client in accordance with said registration information stored in said database;
        means for sending said registration questionnaire over the network to the user of each said network client; and
        means for receiving answers to said registration questionnaire from the user of each network client, and adding the answers to the registration information of the database, wherein said system further has means for conducting surveys in one of different languages comprising means for building a survey in the language of the user to receive the survey, means for sending said survey over the network to the user, means for receiving answers to said questions of said survey, means for tallying said answers in accordance with the country of the user, and means for sending to the user a summary of the results of the survey for at least the country of the user.

28. The system according to claim 27 wherein said network server further comprises means for generating at least one digital ID for each voter of a survey, storing said generated digital ID in said database, and sending said digital ID to the network client for storage at the network client to enable the network server to detect one of said users who reconnects to the site of the network server.

29. The system according to claim 27 wherein said information stored in said database defines a plurality of campaigns having one of said questionnaires, and said network server further comprises:
    means for enabling said user of each network client to select one of said campaigns when addressing said site of the network server in which said registration questionnaire provided by said building means represents one of said registration questionnaires of said selected campaign.

30. A system for enabling voting on surveys in a plurality of languages, and registering in a plurality of languages over a network comprising:

means for providing a voting site and a registration site on the network addressable by users through computers;

means for enabling each of the users of the voting site to answer surveys provided in the languages of the user for the country of the user;

means for sending to each of the users a summary of the results of the survey in the language of the user for at least the country of the user; and means for enabling each of the users of the registration site to answer questionnaires provided in the language of the user.

31. A system for enabling voting on questions in a plurality of languages comprising:

means for providing at least one site on a network addressable by one or more users through computer systems capable of connecting to said network;

means for determining for each of the users of the site the language of the user;

means for determining for each of the users of the site the country of the user;

means for enabling each of the users of the site to answer one or more questions provided in the language of the user and submitting the answers to said questions to the site; and means for tallying the answers submitted by the each of the users in accordance with answers submitted by other of said users for the country of the user.

32. The system according to claim 31 further comprising:

means for sending to each of the users a summary in the language of the user for at least the country of the user in accordance with said tallied answers for said questions.

33. A method for enabling voting on questions in a plurality of languages at a site on a network addressable by one or more users through their respective computer systems, said method comprising the steps of:

connecting to said site by the computer system of the user;

determining a language which represents the language of the user of the computer system;

determining a country which represents the country of the user of the computer system;

answering one or more questions in the language of the user provided by said site to the computer system of the user;

submitting said answers to said questions to the site; and tallying s aid answers submitted by the user in accordance with answers submitted by other ones of said users for the country of the user.

34. The method according to claim 33 further comprising the step of:

sending a summary in the language of the user to the computer system of the user in accordance with said tallied answers for said questions for at least the country of the user.

35. A network addressable site for enabling voting on questions in the different languages of users of the site in which the users are from one or more countries, said site comprising at least one first computer system providing at least one site on a network addressable by one or more users through second computer systems capable of connecting to said network, in which said first computer system is capable of sending to each of said second computer systems one or more questions in the language of the user to enable the user of said second computer system to provide answers to said questions and to submit the answers to said first computer system, and said first computer system tallies the answers submitted in accordance with answers submitted by other of said users for at least the country of the user.

36. The network addressable site of claim 35 wherein said first computer system sends t o said second computer system having submitted said answers a summary in the language of the user in accordance with said tallied answers for said questions for at least the country of the user.

* * * * *